US012784766B1

(12) United States Patent
Basheer et al.

(10) Patent No.: US 12,784,766 B1
(45) Date of Patent: Nov. 3, 2026

(54) PRESENCE DETECTION CALIBRATION

(71) Applicant: Amazon Technologies, Inc., Seattle, WA (US)

(72) Inventors: Mohammed Rana Basheer, Costa Mesa, CA (US); Krishna Kamath Koteshwara, San Jose, CA (US); Feng Zhang, Sunnyvale, CA (US); Zhen Xie, San Jose, CA (US); Trausti Thor Kristjansson, San Jose, CA (US); Avinash Joshi, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 19/093,876

(22) Filed: Mar. 28, 2025

(51) Int. Cl.

| | |
|---|---|
| ***G08B 13/00*** | (2006.01) |
| ***G10L 15/22*** | (2006.01) |
| ***G10L 25/78*** | (2013.01) |
| ***H04B 17/21*** | (2015.01) |
| *H04W 84/12* | (2009.01) |

(52) U.S. Cl.
CPC .............. *G10L 25/78* (2013.01); *G10L 15/22* (2013.01); *H04B 17/21* (2015.01); *H04W 84/12* (2013.01)

(58) Field of Classification Search
CPC ......... G10L 25/78; G10L 15/22; H04B 17/21; H04W 84/12
See application file for complete search history.

(56) References Cited

U.S. PATENT DOCUMENTS

| | | | | |
|---|---|---|---|---|
| 10,795,018 | B1 | 10/2020 | Koteshwara | |
| 11,271,629 | B1 | 3/2022 | Um et al. | |
| 11,564,036 | B1 * | 1/2023 | Kamath Koteshwara | H04R 5/027 |
| 11,982,737 | B1 | 5/2024 | Liu et al. | |
| 12,379,489 | B1 * | 8/2025 | Chillara | G01S 15/003 |
| 12,436,276 | B1 * | 10/2025 | Rao | G01S 7/521 |
| 12,455,372 | B1 * | 10/2025 | Kandadai | G01S 15/04 |
| 2026/0072162 | A1 * | 3/2026 | Soman | G01S 15/04 |

* cited by examiner

*Primary Examiner* — Toan N Pham
(74) *Attorney, Agent, or Firm* — Pierce Atwood LLP

(57) ABSTRACT

A system may use Wi-Fi channel state information (CSI) to configure ultrasonic presence detection (USPD) in a user device. Minor motion events in the vicinity of the user device may occur close to the noise floor of USPD such that noise transients can trigger false presence readings. In contrast, CSI can be highly sensitive to minor movements but may detect motion outside the area of interest; for example, in another room. Accordingly, the system may use CSI to confirm vacancy for purposes of tuning USPD. A first implementation of the system may use CSI to configure conditions for USPD-based state transitions in an adaptive state machine. A second implementation may use statistical methods to calculate parameters for detecting minor motion in USPD data. A third implementation may knowledge distillation techniques to transfer an embedding space from a network that processes CSI to a network that processes ultrasound data.

20 Claims, 13 Drawing Sheets

PRESENCE DETECTION CALIBRATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
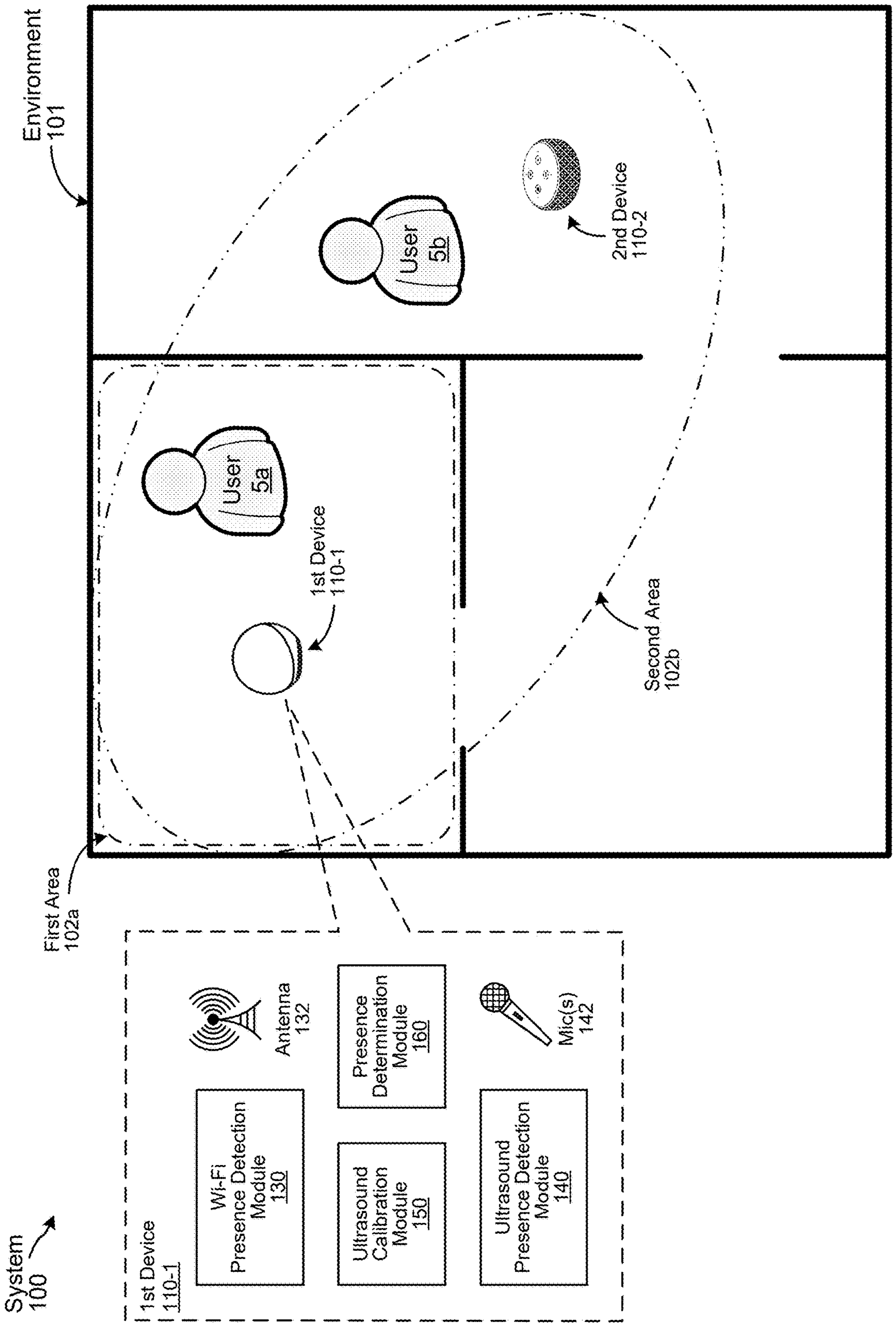
FIG. 1 illustrates a system configured for calibrating a presence determination component, according to embodiments of the present disclosure.

The systems and methods described herein may employ various natural language processing and generation technologies. For example, automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Speech synthesis (sometimes referred to as text-to-speech or TTS) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech is a field of computer science, artificial intelligence, and linguistics in which embedding data is generated to represent speech in audio data and, using one or more models, the embedding data is processed to generate audio data and/or a system (e.g., API) command responsive to the speech. Language modeling (LM) is the use of various statistical and probabilistic techniques to determine the probability of a given sequence of words occurring in a sentence. LM can be used to perform various tasks including understanding a natural language input (e.g., when noise is present) and performing generative tasks that involve generating natural language output data.

Some or all of these technologies may be combined in a natural language processing and generation system that can act as a virtual assistant. An example of a virtual assistant is Amazon Alexa. A user may interact with Alexa (or other virtual assistant) using speech inputs and/or outputs. For example, the user may speak a command to a user device, which may process the speech and perform the requested action. In some cases, the user device may respond with synthesized speech. Example user devices may include speech-detection devices (e.g., smart speakers) such as Amazon Echo devices, smart TVs such as Amazon FireTV devices, mobile phones, Bluetooth speakers, and/or other devices such as those illustrated in FIG. 10.

Various features of a user device may be enabled or improved by being able to detect the presence of a user in the vicinity of the device. By detecting presence or vacancy, the user device may perform actions such as turning on or off lights, controlling media playback (e.g., switching output from a first user device to a second user device as the user leaves one room and enters another), entering a power-save mode when a room is vacant, etc. A user device may detect presence or vacancy using various signals including ultrasound presence detection (USPD), acoustic detection, Wi-Fi channel state information (CSI), machine vision, tactile input, etc. Some such signals (e.g., USPD and CSI) may detect presence by detecting movement of a user. USPD and CSI signals may differ in their sensitivity and range. For example, USPD may reliably detect major movements (e.g., walking, sitting down or standing up) in the room in which the user device is situated. USPD may also be sensitive enough to detect minor movements (e.g., turning a page, lifting a cup); however, such movements may result in signals close to the noise floor of the USPD sensor and/or circuitry, which may allow noise transients to result in a false detection of presence in a room that is actually vacant. In contrast, CSI may may be highly sensitive to minor movements, but may detect such movements outside of the area of interest. For example, the user device may determine CSI based on a Wi-Fi (and/or other wireless) signal sent from a device in another room; therefore, movements represented in the CSI may also result in a false detection of presence in the room in which the user device is situated.

Offered herein are systems and methods for calibrating USPD based on CSI. Because of the sensitivity of CSI to minor movement, the system may use the CSI to confirm vacancy for the purpose of calibrating USPD to reduce or eliminate false detections of presence. For example, if the system detects no major or minor movements over a period of time (e.g., one to several minutes) during which it can confirm vacancy of the area of interest, the system may use USPD data collected during that time to calculate one or more parameters that characterize USPD signals corresponding to vacancy, including noise transients. During inference, the system may use the parameter(s) to determine when noise transients (e.g., manifesting as USPD readings exceeding a threshold) likely correspond to a vacant room, and should thus be ignored.

In an example operation, the system may initially detect presence using a reliable signal for the area of interest, such as a USPD major motion event. In some implementations, the system may leverage other signals such as machine vision-based presence detection, voice activity detection (VAD), tactile input, etc., to determine presence. In other words, the system may ignore indications of minor movement based on the assumption that presence in an area of interest typically begins with a major motion event (e.g., a person entering the room). The system may monitor both major and minor motion events until it determines that the area of interest is vacant. The system may determine vacancy in various ways, including not detecting major or minor motion via USPD for a period of time (e.g., one to several minutes). The system may make presence/vacancy determinations periodically (e.g., every few minutes) and/or based on detected events (e.g., major motion and/or other reliable indications of presence such as those based on machine-vision, voice, tactile input, etc.). Once the system determines that the area of interest is vacant, the system may commence a learning period in which it collects CSI and USPD data. The system may collect data for one minute, two minutes, four minutes, 8 minutes, etc. The collection period may be user configured and/or determined based on processing of the data collected. If the system confirms vacancy for the period of time corresponding to the collected USPD data, the system may process the USPD data to calculate one or more parameters to be used in distinguishing minor motion from noise transients during runtime.

The system may calculate and use the parameter(s) in various different ways. In a first implementation, the system may use CSI to configure conditions for USPD-based state transitions in an adaptive state machine. The system may determine whether the area of interest around the user device is in a "presence detected" (e.g., "occupied") state, or a "vacancy detected" (e.g., "vacant") state. The system may transition in to the "presence detected" state upon detection of major motion. The system may transition to the "vacancy detected" state based on whether one or more conditions are satisfied. For example, based on an assumption that minor motion events may be accompanied by occasional major motion events, the system may transition to the "vacancy detected" state if the system detects no major motion events for a certain duration of time (e.g., several minutes) and/or if it detects more than a certain number of minor motion events between major motion events. Regarding the second condition, the system may maintain a counter and transition to "vacant" if the counter exceeds a maximum counter value. The system may determine the maximum counter value during the learning phase by determining a threshold for the USPD data that corresponds to, for example, a $90^{th}$ percentile value. The system may be configured with different percentile thresholds used in different implementations and/or use cases. That is, if the USPD data is a time sequence of probability values, the system may determine a threshold such that 90% of the values are below the threshold. The 10% of values above the threshold may represent events that the system may use to determine whether the USPD data likely represents motion. The system may determine how many such events are likely to occur over the data collection period, which corresponds to a period between (and/or in absence of) a major motion event. During inference, the system may increment a counter when it detects a minor motion event and reset the counter if it detects a major motion event. If during an occupied state the system determines that the counter exceeds the maximum counter value (and/or the timer expires), the system may transition to the vacant state. The threshold, counter, and/or the timer duration may differ for different user devices, areas of interest, etc.

In a second implementation, the system may use statistical methods to calculate parameters for detecting minor motion in USPD data. In a manner similar to the above, the system may determine a probability threshold for USPD events, and determine the mean and variance of time gaps (e.g., intervals) between consecutive threshold-exceeding events during the learning phase. Noise transients may be expected to occur independently (e.g., the occurrence of one event does not affect the probability of occurrence of the other) and at a constant mean rate, while events resulting from motion in the area of interest may be expected to correlate with each other. Based on these assumptions, the system may, during the inference phase, determine a likelihood that threshold-exceeding events correspond to motion events or noise. The system may implement a second threshold for determining when the likelihood corresponds to motion, and thus an occupied state.

In a third implementation, the system may use knowledge distillation techniques to transfer an embedding space from a network that processes CSI to a network that processes ultrasound data. CSI-based presence detection and USPD may include processing the CSI data and ultrasound data with respective neural networks. The system may collect CSI data and ultrasound data from a period of confirmed vacancy, and process each with the appropriate network. The system may extract embedding data from an intermediate layer of each network and compare them. The embedding data may represent a raw vector or score(s), etc. prior to a final presence/vacancy determination (e.g., probability and/or classification) by an output layer or layers of the neural networks. Using the embedding data from the neural network processing CSI as a ground truth, the system may calculate a loss from the embedding data from the neural network processing the ultrasound data. The system may use the loss to calculate gradients and update parameters of the ultrasound neural network (e.g., using gradient descent and/or backpropagation). In this manner, the system may transfer an embedding space of the teacher CSI neural network to the student ultrasound neural network in a knowledge distillation process. In some implementations, the system may aggregate embedding data, gradients, and/or updated parameters from multiple devices and distribute the aggregated data to the devices to improve the reliability of ultrasound-based presence detection further.

Although the disclosed detection and calibration techniques are described in the context of speech processing systems and devices, the systems and methods are not so limited, and may be used with devices that lack natural language and/or speech processing capabilities. For example, the presence detection and calibration techniques may be applied to myriad devices and use cases such as Internet of Things (IoT) devices, smart-home and smart-building devices and systems, vehicles, appliances, alarm systems, etc. In various implementations, systems and methods may use these techniques in combination with each other and/or other features described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 configured for calibrating a presence detection component, according to embodiments of the present disclosure. In some implementations, the user device 110 may be, for example, a voice-controlled device; however, embodiments of the invention are not so limited. A user 5*a* and/or 5*b* may interact with a user device 110 using a combination of inputs and outputs including voice, text, and/or images. The user may speak or otherwise provide input audio to the user device 110. The user device 110 may respond with synthesized speech and/or other output audio. The user device 110 may also process and/or generate text data and/or image data. The natural language command processing and generation capabilities of the system 100 are described in further detail below with reference to FIG. 7.

Figure 7:
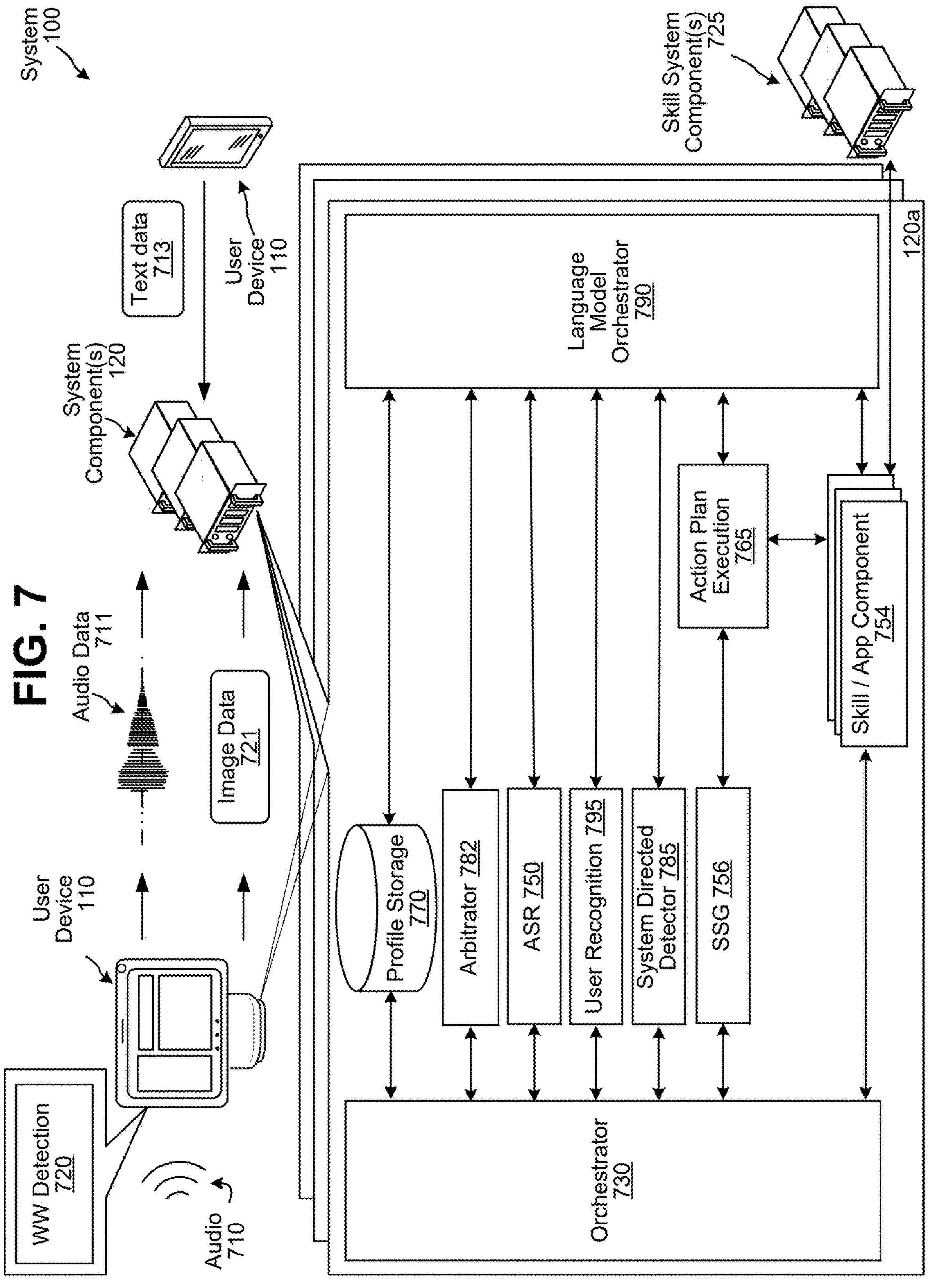
FIG. 7 is a conceptual diagram illustrating example speech processing components of the system, according to embodiments of the present disclosure.
Figure 9:
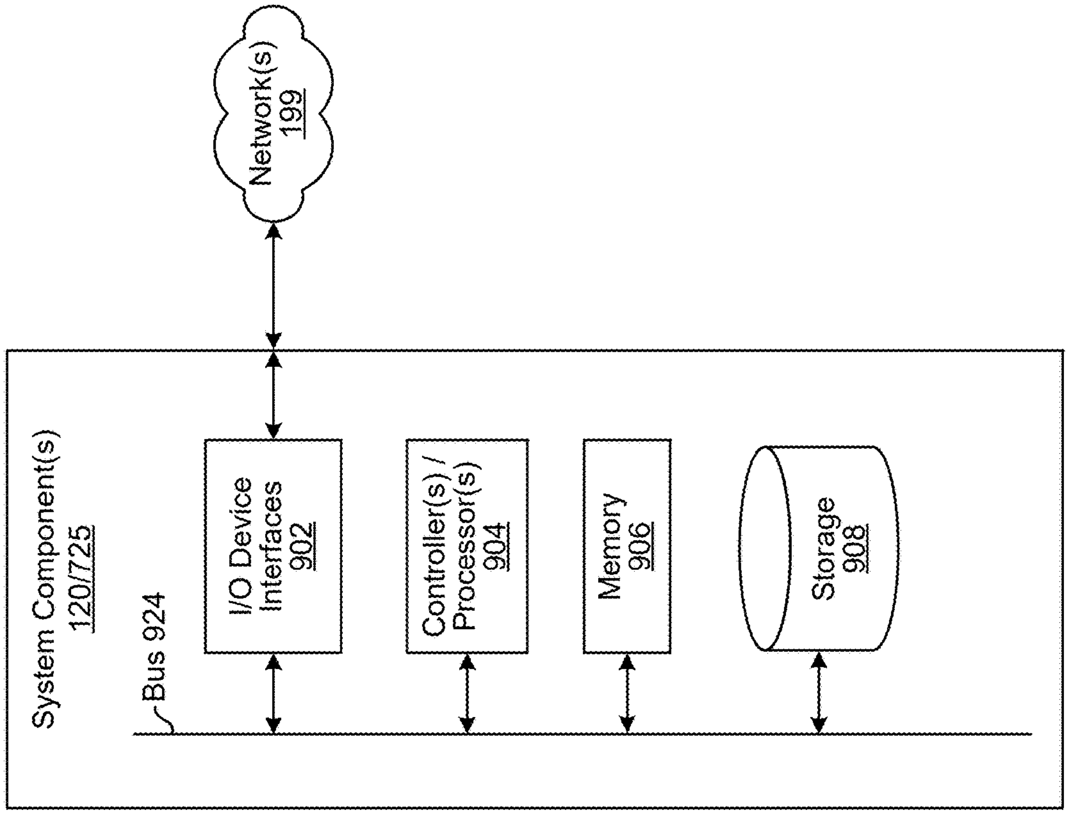
FIG. 9 is a block diagram conceptually illustrating example components of a system, according to embodiments of the present disclosure.
Figure 10:
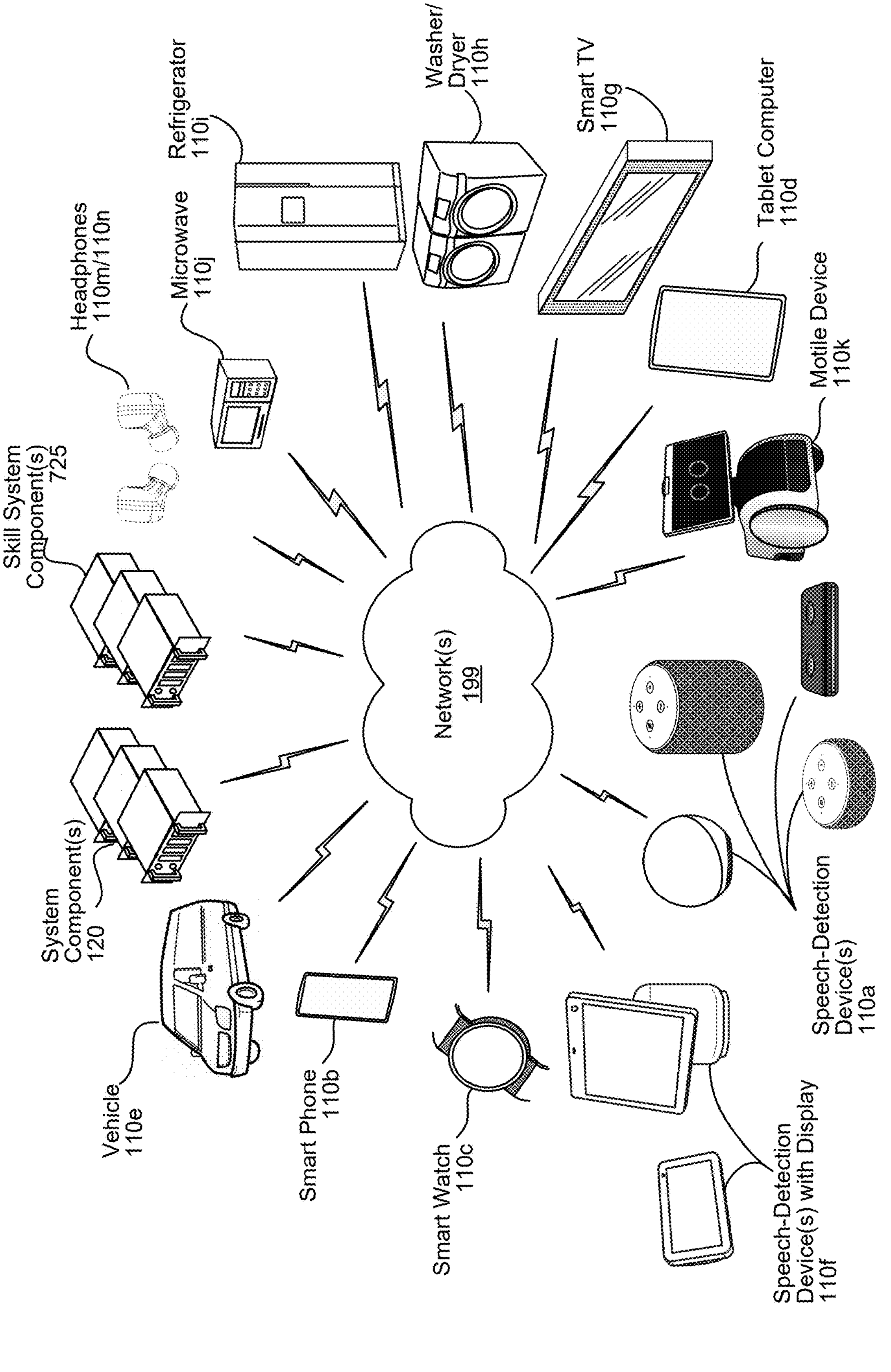
FIG. 10 illustrates an example of a computer network for use with the overall system, according to embodiments of the present disclosure.

In various implementations, the user device 110 may be one of the user devices 110 shown in FIG. 10 and may have a visual display (e.g., monitor). The user device 110 may include various hardware and/or software components such as those shown in FIG. 8. In some implementations, functions and/or features described herein may be performed by components on the user device 110. In some implementations, some or all of the components described in FIG. 1 may reside on one or more system components 120 as shown in FIG. 7. The system component 120 may include various hardware and/or software components such as those shown in FIG. 9. In some implementations, the components and/or the functions of the components may be shared and/or divided between a user device 110 and one or more system components 120. One or more user devices 110 and, in some implementations, one or more system components 120, may make up the system 100. The system 100 may include more, fewer, and/or different components without departing from the scope of this disclosure.

FIG. 1 shows an example environment 101 in which a first user device 110-1 is in a first room and a second user device 110-2 in a second room. The first user device 110-1 (and, in some cases, the second user device 110-2) may include a Wi-Fi presence detection module 130 configured to process a Wi-Fi signal received by one or more antennas 132, and an ultrasound presence determination (USPD) module 140 configured to process an ultrasound signal received by one or more microphones 142. In some implementations, the microphone(s) 142 may operate in the audible-frequency range (e.g., capturing frequencies typically detectable by the human ear), while the user device 110 includes one or more separate ultrasonic receivers configured to capture ultrasound signals (e.g., outside of the range of typical human hearing). The user device 110 may include one or more audio transducers for outputting audio including audio in the audible-frequency range (e.g., frequencies typically detectable by the human ear) and/or ultrasound audio for purposes of performing USPD. In some implementations, the ultrasound transducer(s) may be the same as or in addition to a loudspeaker of the user device 110 (e.g., the loudspeaker(s) 812 shown in FIG. 8). In some implementations, the user device 110 may include one or more ultrasonic transmitters for outputting the ultrasonic signal. The ultrasonic transmitter(s) and receiver(s) may make up an ultrasonic sensor system of the user device 110, and may be used to perform USPD functions as described herein.

The Wi-Fi presence detection module 130 and the ultrasound presence detection module 140 may output presence detection data, which may indicate detection of (and, in some cases, distinguish between) major motion events and/or minor motion events. The user device 110 may include a presence determination module 160 that includes hardware and/or software configured to receive the presence detection data and output a presence/vacancy determination. Other components of the user device 110 and/or the system 100 more broadly may consume presence/vacancy determination for various purposes such as controlling media playback, smart-home devices such as lighting and environmental controls, burglar alarms, etc. The user device 110 may additionally include an ultrasound presence detection calibration module 150, which may use the motion detection data from the Wi-Fi presence detection module 130 to calibrate the ultrasound presence detection module 140 and/or configure the presence determination module 160 to improve the accuracy of USPD-based presence/vacancy determinations.

The Wi-Fi presence detection module 130 may include hardware and/or software configured to receive a Wi-Fi signal via the antenna(s) 132, measure CSI, and use the CSI to determine a probability that the CSI indicates presence or vacancy. The Wi-Fi signal may be a wireless communication signal corresponding to one (or more) of the Wi-Fi protocols based on the Institute of Electrical and Electronics Engineers (IEEE) 802.11 family of standards. Wi-Fi signals facilitate local area networking of devices, including connection to the Internet, via radio waves (e.g., typically in the frequency range(s) of 900 MHz, 2.4 GHz, 3.6 GHz, 4.9 GHz, 5 GHz, 6 GHz and 60 GHz). The use of Wi-Fi is used as an example to illustrate operation of the system 100, but in some implementations the system 100 may use other wireless signals, whether or not the signal is one ordinarily used to communicate data. Various wireless signals (e.g., electromagnetic radiation) may be used to detect motion between user devices if the user device 110 can be configured to measure changes in the received signal resulting from movement in or near the signal path. Such signals may be in one of the radio bands used by the Wi-Fi protocols or other radio band (generally in the MHz to GHz range). Wi-Fi protocols are suitable for such an application due to the availability of standardized radios and antennas, which enable techniques for channel estimation (e.g., to determine CSI) to be consistently implemented across a broad range of device types. CSI represents information about how a Wi-Fi (or other) signal propagates from a transmitter to a receiver, including scattering, fading, and power decay. The second user device 110-2 may transmit the Wi-Fi signal and the first user device 110-1 may receive the signal and perform channel estimation to determine the CSI. The Wi-Fi presence detection module 130 may determine based on changes in the CSI (e.g., indicating changes in amplitude and or propagation delay) that someone or something is moving into, out of, or within the signal path. The output of the Wi-Fi presence detection module 130 may indicate major motion events, minor motion events, and/or no motion detected based on the amount and/or rate of change of CSI values.

CSI-based motion detection may identify motion within or near the signal path between the transmitter and receiver. In FIG. 1, this corresponds to a second area 102*b*, indicated by the double-dot-dashed line, encompassing both the second user device 110-2 (e.g., the transmitter) and the first user device 110-1 (e.g., the receiver). Thus, motion detected by the first user device 110-1 using CSI may correspond to the room containing the first user device 110-1 or the room containing the second user device 110-2. For example, movements of a second user 5*b* may lead to a false detection of presence by the first user device 110-1 even if the room the first user device 110-1 is in is vacant. CSI-based motion detection may thus be an unreliable signal for presence determination in a first area 102*a* that represents the immediate vicinity of the first user device 110-1 and/or the room in which the first user device 110-1 is located. A CSI-based detection of an absence of motion, however, may reliably indicate the vacancy of the second area 102*b*, which may include some or all of the first area 102*a*. Thus, a CSI-based vacancy determination may be used to tune one or more parameters of ultrasound-based presence detection.

The ultrasound presence detection module 140 may include hardware and/or software configured to receive an ultrasound signal from the microphone(s) 142 and determine a likelihood that the ultrasound signal represents indicates presence or vacancy (e.g., based on detection of major motion events, minor motion events, and/or an absence of motion). The ultrasound signal may represent an echo and/or scattering of an ultrasound signal off various surfaces within the first area 102*a*. Movement within the first area 102*a* may change a timing, amplitude, and/or phase of the received ultrasound signal. The ultrasound presence detection module 140 may output a probability that the ultrasound signal indicates presence in the first area 102*a*. In some implementations, the presence determination module 160 may distinguish minor motion from noise, and major motion from minor motion, using different thresholds. For example, the presence determination module 160 may implement a first threshold just above the noise floor such that events exceeding the first threshold likely indicate minor motion events (subject to the various techniques described herein for distinguishing motion-based signals from noise transients), and events exceeding a higher, second threshold indicate major motion events. The distinction between minor and major motion events may be qualitative or quantitative; as used herein, however, minor motion events may refer to events represented in signals close enough to the noise floor of USPD to be subject to false positives due to noise transients in the ultrasound sensor(s) and/or circuitry.

Because solid, continuous surfaces such as walls, ceilings, and floors may reflect and/or block the ultrasound signal, the sensitivity of USPD to movement may be limited to the room in which the user device 110 is located; that is, the first area 102*a*. Thus, unlike CSI-based motion detection, USPD performed by the first user device 110-1 may detect motion of the first user 5*a* in the same room, but not the second user 5*b* in a different room. Ultrasound-based motion detection is not as sensitive as CSI-based motion detection, however, and minor motion events such as breathing, fidgeting, etc., may appear close to the noise floor of the microphone(s) 142 and/or circuitry of the ultrasound presence detection module 140. As a result, when a detection threshold is set suitably low to reliably capture minor motion events, noise transients may cause false positive detections of motion and therefore presence. Complicating matters, the noise floor and noise transients may vary from user device 110 to user device, making them difficult to compensate for.

Accordingly, the ultrasound calibration module 150 may include hardware and/or software configured to use indications of vacancy (e.g., absence of movement) output by the Wi-Fi presence detection module 130 to tune one or more parameters of the system 100 to characterize the typical noise transients and/or noise floor of the ultrasound presence detection module 140 to reduce or eliminate false detection of motion. In some implementations, the ultrasound calibration module 150 may tune one or more parameters of the ultrasound presence detection module 140 and/or presence detection module 160 that are used to determine whether an ultrasound signal indicates a minor motion event or just noise. For example, the ultrasound calibration module 150 may use statistical techniques to characterize the typical noise transients and/or noise floor of the ultrasound presence detection module 140 during periods of vacancy as confirmed using CSI-based presence detection, and use the parameter(s) learned to calculate the probability that USPD events detected during inference likely do or do not correspond to motion. An example of such statistical techniques is described in further detail below with reference to FIGS. 4A and 4B. In another example, the ultrasound calibration module 150 may transfer an embedding space of a CSI-based motion detection neural network to an ultrasound-based motion detection neural network using a process of knowledge distillation. An example of knowledge distillation is described in further detail below with reference to FIG. 6A. Additionally or alternatively, the ultrasound calibration module 150 may configure one or more parameters of the presence determination module 160 used to determine when to transition from a "presence detected" state to a "vacancy detected" state, or vice versa. An example of an adaptive state machine is described in further detail below with reference to FIG. 3.

Figure 2A:
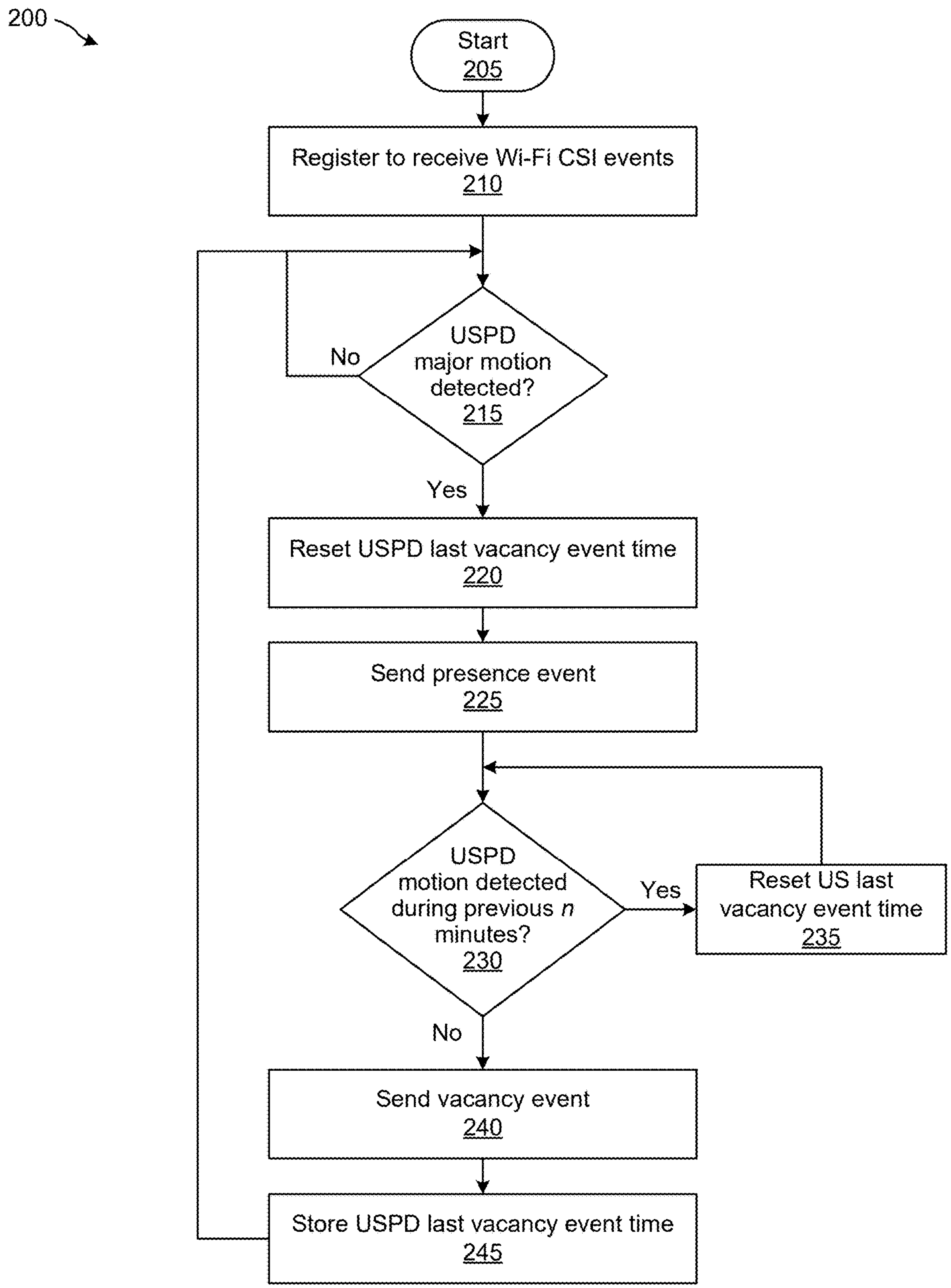
FIG. 2A is a flowchart illustrating example method runtime operation of the system, according to embodiments of the present disclosure.

FIG. 2A is a flowchart illustrating example method 200 runtime operation of the system, according to embodiments of the present disclosure. The system 100 may perform the method 200 before or after tuning/configuring USPD. Upon initiation, the user device 110 may not generate a determination of presence or vacancy until it has detected a major motion event. In some implementations, the user device 110 may produce a default presence or vacancy indication until it acquires enough a CSI or ultrasound data to make a presence or vacancy determination. The user device 110 may generate an indication of presence detected upon identifying, using the ultrasound presence detection module 140, a major motion event. The user device 110 may maintain the presence detected indication while it continues to detect major or minor motion. During operation, the ultrasound presence detection module 140 and/or the presence determination module 160 may maintain one or more timers. The system 100 may use a first timer to monitor periods of vacancy for purposes of tuning the ultrasound presence detection module 140 and/or presence determination module 160 (which may require an adequate amount of buffered CSI and/or ultrasound data, typically corresponding to several minutes). The system 100 may use a second timer to determine when to perform periodic processing of buffered USPD data and/or to monitor the duration of gaps (e.g., intervals) between detecting motion events. If n minutes elapse without detecting major or minor motion, the user device 110 may generate an indication of vacancy detected.

After starting at step 205, the method 200 may include registering (210) to receive Wi-Fi CSI events. The ultrasound calibration module 150 may send a request to the Wi-Fi presence detection module 130 (and/or to the processor(s) of the user device 110) to receive indications of presence/vacancy. The ultrasound calibration module 150 may use the indications to determine, for example, when to enter a learning phase (e.g., based on a CSI-based vacancy detection). During the inference phase, the method 200 may include determining (215) whether the system 100 has detected a major motion event in the ultrasound signal. If the system 100 does not detect a major motion event ("No" at 215), the user device 110 may continue observing ultrasound data for a major motion event. During this time, the system state may indicate vacancy and remain unchanged. If the system 100 detects a major motion event ("Yes" at 215), the method 200 may proceed to step 220. The method 200 may include resetting (220) the last vacancy event time as determined using USPD. In some implementations, the system 100 may record a clock time of the user device 110. In some implementations, the system 100 may restart a time corresponding to a duration of a presence detected state. The method 200 may include sending (225) an indication of the presence detected state to other components of the user device 110 and/or system 100.

The method 200 may include determining (230) whether the system 100 has detected motion (e.g., either major or minor motion) in the ultrasound signal during the previous n minutes, where n may correspond to a configured or learned duration of time after which the system 100 will determine a vacancy if no motion is detected. If the system 100 detects a motion event during the previous n minutes ("Yes" at 230) the method 200 may include resetting (235) the last vacancy event time in a manner similar to step 220 above. The system 100 may continue to monitor the last vacancy event timer and/or for USPD-based motion detection. If the system 100 does not detect a motion event during the previous n minutes ("No" at 230), the method 200 may include sending (240) an indication of vacancy to other components of the user device 110 and/or system 100. The method 200 may include storing (245) the last vacancy event time. In response to the indication of vacancy, the system 100 may commence a learning phase and begin buffering CSI and USPD data for use in tuning/calibrating one or more parameters of the ultrasound presence detection module 140 and/or the presence determination module 160.

In some implementations, the system 100 may impose other conditions on the determination of presence/vacancy. For example, in an adaptive state machine implementation such as is described below with reference to FIG. 3, the system 100 may determine a vacancy event if the ultrasound presence detection module 140 outputs data indicating more than a certain number of events exceeding the detection threshold for minor movement without detecting an event exceeding the detection threshold for major movement. In such cases, the system 100 may proceed from step 230 to step 240, even if the system 100 has detected minor motion during the previous n minutes. This is based on an assumption that minor motion events may occasionally be accompanied by major motion events, and that frequent detection of possible minor motion events in absence of a major motion event is likely to be due to noise and/or other artifacts and not the presence of a person in the area of interest. Thus, implementing such a counter may prevent the system 100 from generating a false positive indication of presence based on an unusual frequency of noise transients.

In various implementations, certain stages of the method 200 may be modified, repeated, omitted, performed in a different order, and/or performed partially or wholly in parallel with other stages of the method 200.

Figure 2B:
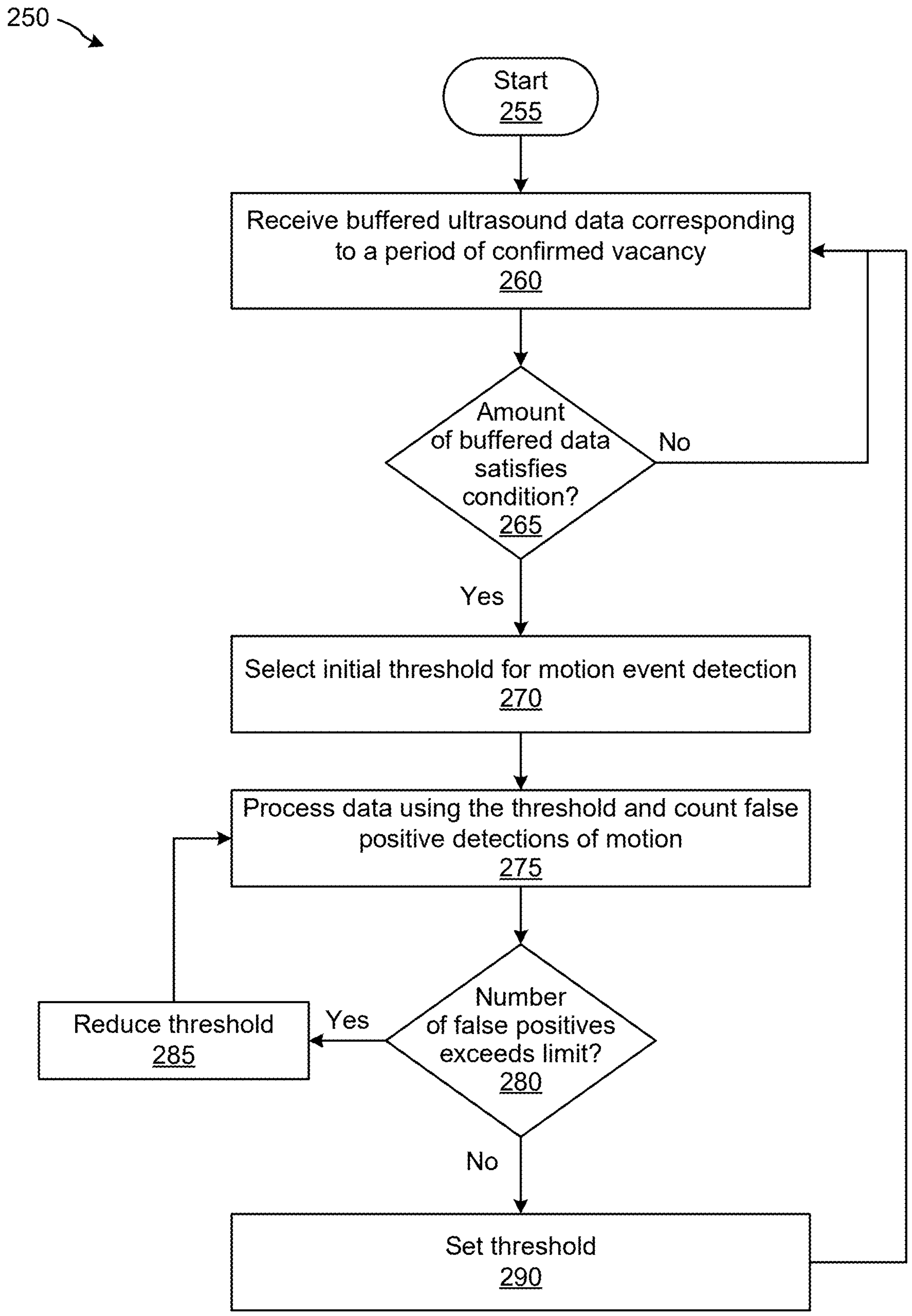
FIG. 2B is a flowchart illustrating example method of tuning a threshold for ultrasound-based motion detection, according to embodiments of the present disclosure.

FIG. 2B is a flowchart illustrating example method 250 of tuning a threshold for ultrasound-based motion detection, according to embodiments of the present disclosure. The method 250 may be performed by the ultrasound calibration module 150. During the learning phase, the ultrasound calibration module 150 may process buffered ultrasound data corresponding to a period of vacancy (e.g., as confirmed using CSI or other reliable signal) to determine a threshold for distinguishing movement from typical noise during the inference phase. The resulting threshold may be sent to the ultrasound presence detection module 140 and/or presence detection module 160 for use in detecting motion events during the inference phase.

After starting at step 255, the method 250 may include receiving (260) ultrasound data corresponding to a period of vacancy as confirmed via CSI-based presence detection and/or other reliable indicator of vacancy including machine vision-based presence detection. The method 250 may include determining (265) whether the amount of buffered data satisfies, or fails to satisfy, a condition. For example, to ensure accurate tuning, the system 100 may only perform calibration when it has a sufficient number of USPD data points. In an example implementation, the system 100 may collect four minutes' worth of USPD data. The user device 110 may measure the USPD signal at a rate of 8 times a second, and average 16 samples to determine a USPD data point (e.g., a probability of presence in the area of interest during those two seconds). Thus, four minutes of USPD data may correspond to 120 data points. In some cases, however, the USPD signal may be interrupted (e.g., because the user device 110 was muted or interference corrupted ultrasound reception and/or measurement), thus the USPD data may include fewer than 120 data points. The system 100 may therefore impose a condition only to proceed with calibration if the buffer includes at least, for example, 90, 120, 190, etc. valid USPD data points (e.g., corresponding to about three minutes worth). In various implementations, the system 100 may impose different conditions for duration of collected data and/or number of valid USPD data points.

If the number of data points fails to satisfy the condition ("No" at 365), the method 250 may return to step 260 and continue collecting ultrasound data. The system 100 may continue filling the buffer using additional ultrasound data from a contiguous period of vacancy, or flush the buffer and begin collecting new ultrasound data starting from the current time or the next determination of vacancy.

If the number of data points satisfies the condition ("Yes" at 365), the system 100 may commence a learning phase, and the method 250 may proceed to selecting (270) an initial (e.g., a first candidate) threshold for the learning phase. The method 250 may include processing (275) the USPD data using the ultrasound presence detection module 140, comparing the output probability to the threshold, and counting the number of false positive detections of motion that would have occurred. The method 250 may include determining (280) whether the number of USPD data points exceeding the threshold exceeds a limit. For example, to tune the presence detection module 160 such that zero false positive detections of motion would have occurred for the buffered USPD data had it been processed during the inference phase, the limit may be set to zero. If one false positive is deemed acceptable, the limit may be set to one, and so on.

If the number of false positives exceeds the limit ("Yes" at 380), the method 250 may include reducing (285) the threshold to a second candidate threshold and returning to step 275. This loop may repeat until the number of false positives no longer exceeds the limit. When the number of false positives does not exceed the limit ("No" at 380), the method 250 may proceed to step 290, and set the threshold for USPD-based motion detection to the value of the candidate threshold found to satisfy the limit on false positive detections of presence.

The system 100 may return to an inference phase and make ultrasound-based presence/vacancy determinations. The system 100 may repeat the method 250 and potentially commence another learning phase upon receiving a subsequent indication of vacancy. In some implementations, the system 100 may return to a learning phase at each confirmed vacancy (e.g., of a duration sufficient for collecting data for USPD tuning). In some implementations, the system 100 may wait a period of time (e.g., several minutes, several hours, several days) before reentering a learning phase to update the USPD parameter(s). In various implementations, certain stages of the method 250 may be modified, repeated, omitted, performed in a different order, and/or performed partially or wholly in parallel with other stages of the method 250.

Figure 3:
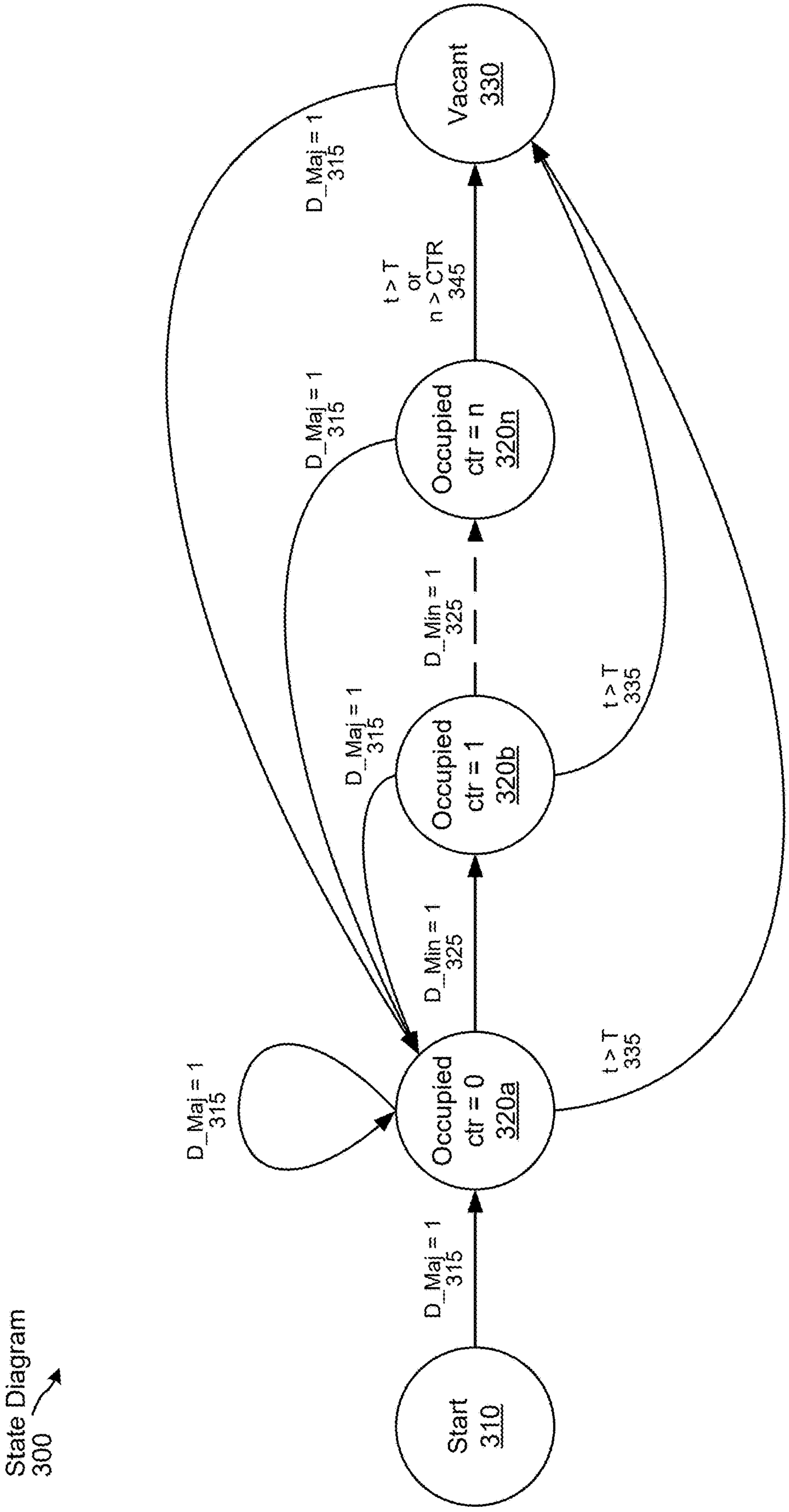
FIG. 3 is a state diagram illustrating operation of a first example presence detection calibration technique, according to embodiments of the present disclosure.

FIG. 3 is a state diagram 300 illustrating operation of a first example presence detection calibration technique, according to embodiments of the present disclosure. The user device 110 (e.g., using the presence determination module 160) may use a state machine operating in the manner illustrated by the state diagram 300 to maintain a presence/vacancy state and determine when to transition between states. The state diagram 300 may include a vacant state 330 and one or more occupied (or "presence detected") states 320. The user device 110 may transition between states when one or more conditions are satisfied. For example, upon initiation (e.g., power up), the user device 110 may enter a start state 310. In the start state 310, the user device 110 may maintain a default state, which may correspond to occupied, vacant, null, etc. The system 100 may transition to a first occupied state 320*a* upon detecting a major motion event 315.

When the system 100 enters the first occupied state 320*a*, it may reset a timer "t" and counter "ctr." If the system 100 does not detect any motion events for a time T (e.g., t>T 335), the system 100 may transition to a vacant state 330 and generate an indication of vacancy. If the system 100 detects a major motion event 315, it may return to the first occupied state 320*a* and reset t and ctr. If the system 100 detects a minor motion event 325, it may transition to a second occupied state 320*b*.

When the system 100 is in the second occupied state 320*b*, it may increment ctr (i.e., now equal to 1). If the system 100 determines that t>T 335 without detecting any motion events, it may transition to a vacant state 330 and generate an indication of vacancy. If the system 100 detects a major motion event 315, it may return to the first occupied state 320*a* and reset t and ctr. If the system 100 detects a minor motion event 325, it may transition to a third occupied state, and so on to an $n^{th}$ occupied state 320*n*.

To avoid generating false indications of presence, the user device 110 may return to the vacant state 330 and output an indication of vacancy if the system 100 detects more than a maximum number of minor motion events ("CTR") between detecting major motion events. In contrast to tuning other USPD parameters using USPD data corresponding to periods of confirmed vacancy, the system 100 may tune the CTR value based on periods of time during which the ultrasound presence detection module 140 is detecting motion events. The ultrasound calibration module 150 may process USPD data from many such periods and determine that minor motion events (e.g., when ultrasound data exceeds a first threshold corresponding to minor motion but not a second threshold corresponding to major motion) tend to occur only so many times in absence (e.g., between) major motion events. Thus, the system 100 detecting more than this number of minor motion events without detecting a major motion event may indicate an increase in noise in the ultrasound sensor and/or circuitry, rather than actual motion of a user in the area of interest. Accordingly, the ultrasound calibration module 150 may tune the CTR value (e.g., during the learning and/or inference phase) to correspond to a typical number of minor motion events observed to occur between major motion events, plus some additional margin (e.g., plus 5%, 10%, 20%, etc.). Thus, the system 100 may transition from the $n^{th}$ occupied state 320*n* to the vacant state 330 when either condition t>T or n>CTR 345 is satisfied.

Alternatively, the CTR may be configured by a user, and a threshold for motion event detection in the USPD data may be tuned during the learning phase. In other implementations, both CTR and the threshold may be user configured or learned. In any case, the system 100 may have a number of occupied states 320 n=CTR. When in the $n^{th}$ occupied state 320*n*, if the system 100 detects another minor motion event 325, it may transition to the vacant state 330 and generate an indication of vacancy.

Figure 4A:
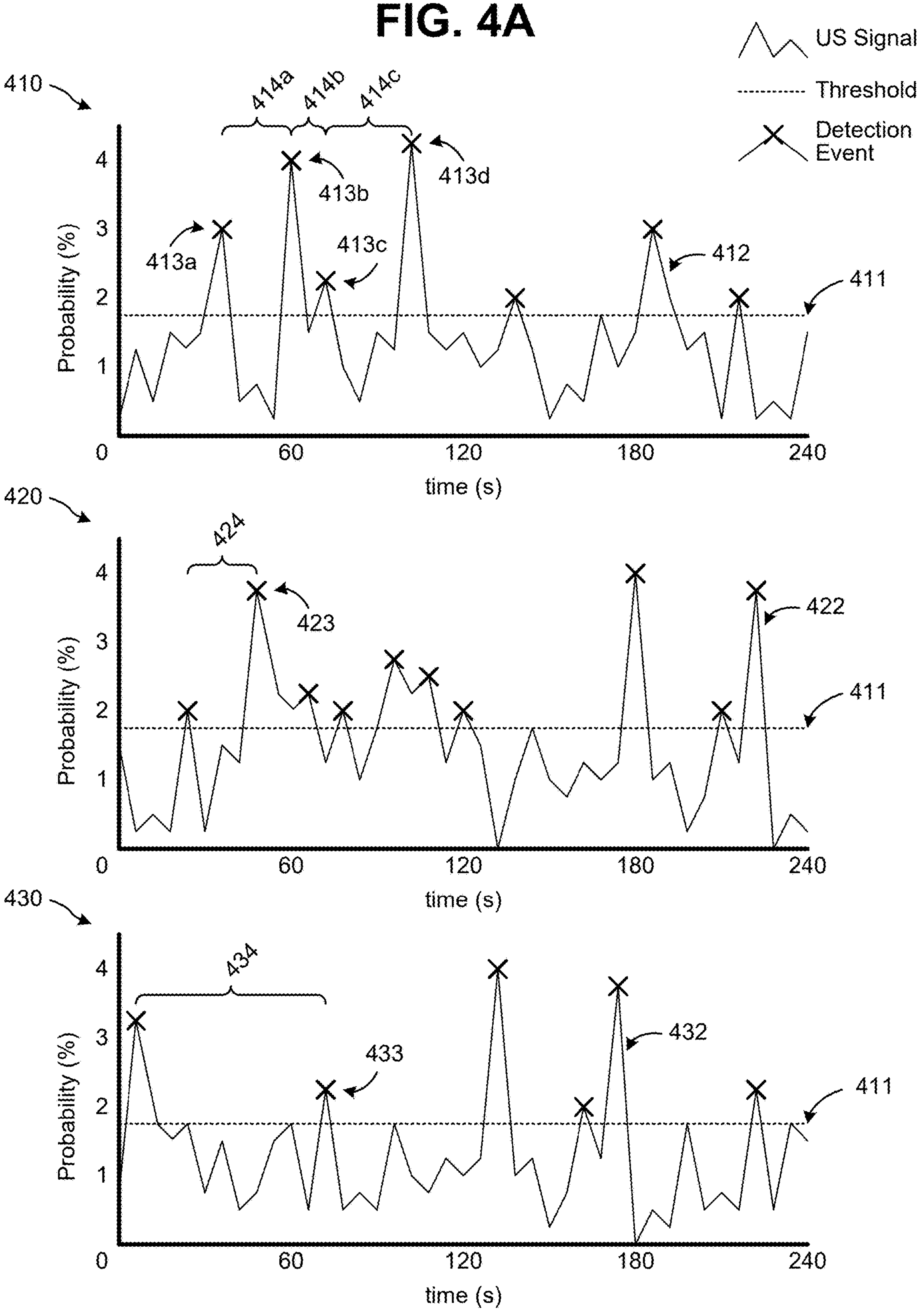
FIG. 4A shows graphs illustrating a second example implementation of a presence detection technique, according to embodiments of the present disclosure.

FIG. 4A shows graphs 410, 420, and 430 illustrating a second example implementation of a presence detection technique, according to embodiments of the present disclosure. The first graph 410 represents USPD data collected during the learning phase. The USPD data may represent probabilities of presence in the area of interest as determined by the ultrasound presence detection module 140. The second graph 420 and third graph 430 represent USPD data collected during inference phases. The graphs 410, 420, and 430 plot USPD data values (e.g., probabilities) over time as indicated by the solid line. The graphs 410, 420, and 430 include a threshold 411, indicated by a dotted line, set at some percentile (e.g., the $90^{th}$ percentile) of USPD probability values during a period of confirmed vacancy. In this case, the threshold 411 corresponds to a presence probability of 1.8%. The threshold configured or determined during the learning phase may be used during a subsequent inference phase. Events exceeding the threshold 411 are indicated by an X. The ultrasound calibration module 150 may determine the time between consecutive threshold-exceeding events. Such times are indicated in the graphs 410, 420, and 430 with a curly bracket.

The first graph 410 illustrates USPD probabilities corresponding to USPD data collected during the learning phase; that is, a period of confirmed vacancy of the area of interest. The first graph 410 shows a time plot of the USPD probabilities 412, and indicates events 413 where values of the USPD probabilities 412 exceed a threshold 411 (e.g., set at the $90^{th}$ percentile of all USPD probability values). The first graph 410 indicates a first time gap 414*a* between a first event 413*a* and a second event 413*b*, a second time gap 414*b* between the second event 413*b* and a third event 413*c*, and a third time gap 414*c* between the third event 413*c* and a fourth event 413*d*, and so on.

The ultrasound calibration module 150 may determine the durations of time gaps 414 (e.g., intervals) between events, and calculate a mean and variance of the time gaps 414. The presence determination module 160 may use the mean and variance during the inference phase to calculate a likelihood that detected events correspond to motion rather than noise (e.g., using a Poisson distribution). Threshold-exceeding events 413 may correspond to noise transients in the ultrasound sensor and/or circuitry of the user device 110. Assuming the noise is random, the threshold-exceeding events 413 may be assumed to be independent and identically distributed. In other words, the threshold-exceeding events 413 may exhibit no overall trends, and the occurrence of an event 413 may be uncorrelated with the previous event(s) 413. Thus, based on the calculated mean and variance, the presence determination module 160 may determine the likelihood that USPD data acquired during the inference is likely to arise from random noise the same as or similar to noise characterized during the learning phase; and conversely, the probability that the USPD data represents events representing some correlation or trend, as would occur if the events are based on movement.

The second graph 420 shows a time plot of USPD probabilities 422, collected during the inference phase. The second graph 420 may indicate events 423 separated by time-gaps 424. The presence determination module 160 may calculate a likelihood that the USPD probabilities 422 represents movement or random noise. The ultrasound presence detection module 140 may use a second threshold—for example, corresponding to a likelihood of 50%, 65%, 80%, etc.—to classify the USPD probabilities 422 as representing motion (and thus presence) rather than noise. In some implementations, the second threshold may represent a condition for state transition as was described previously with reference to FIG. 3. For example, the presence determination module 160 may determine that a presence likelihood exceeding 50% corresponds to a detection of minor motion (e.g., D_min=1 325) and a presence likelihood exceeding a third threshold (e.g., 90%) corresponds to a detection of major motion (e.g., D_Maj=1).

The third graph 430 shows a time plot of USPD probabilities 432, collected during the inference phase. The third graph 430 may indicate events 433 separated by time-gaps 434. The presence determination module 160 may calculate a probability that the USPD probabilities 432 represents movement or random noise based on the meant and variance calculated during the learning phase. The presence determination module 160 may determine that the USPD probabilities 432 represent a relatively low likelihood of presence, and thus likely correspond to vacancy.

Figure 4B:
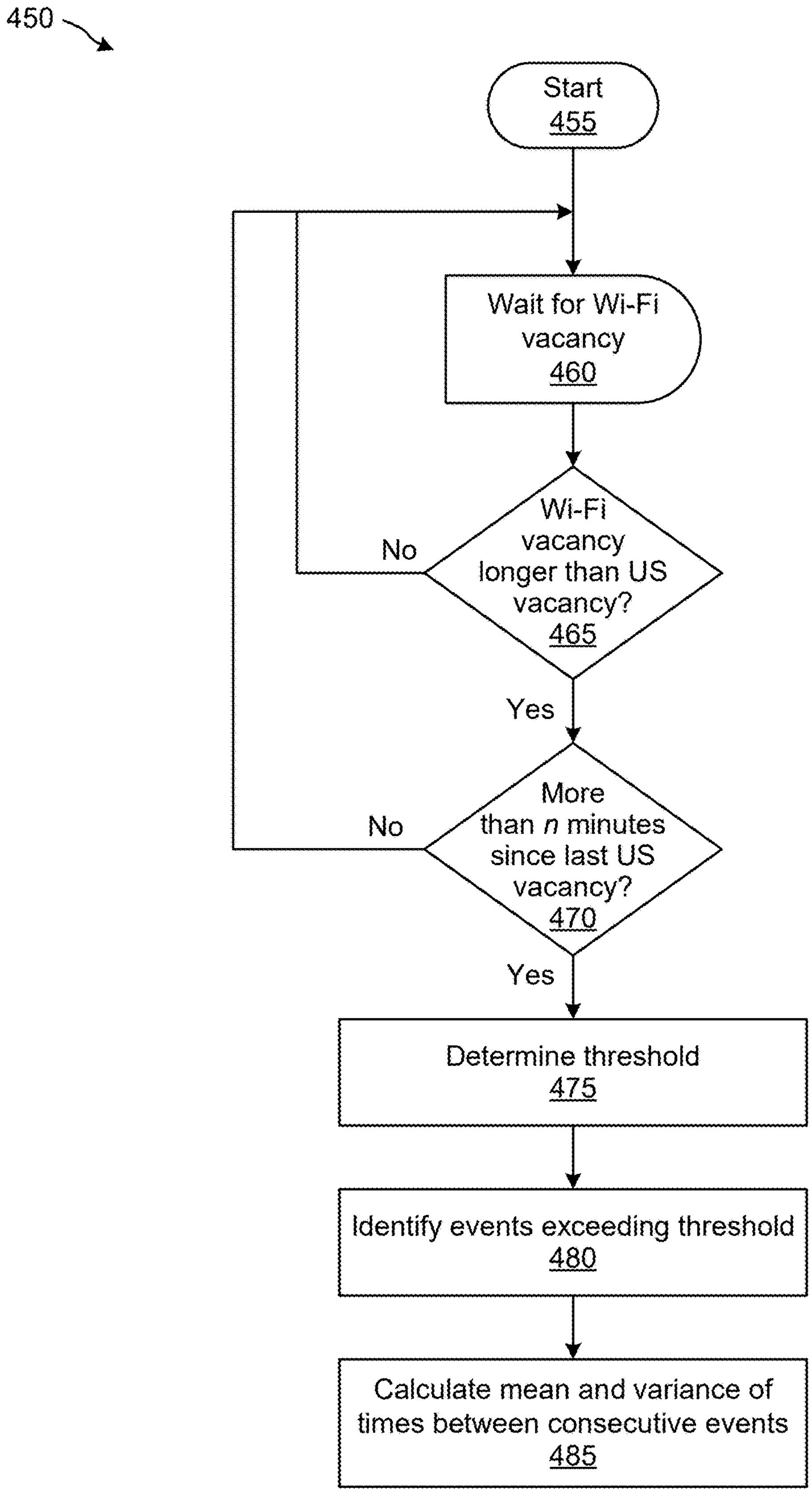
FIG. 4B is a flowchart illustrating an example method of implementing a learning algorithm of the system, according to embodiments of the present disclosure.

FIG. 4B is a flowchart illustrating an example method 450 of implementing a learning algorithm of the system 100, according to embodiments of the present disclosure. The system 100 may use method 450 to determine that both CSI and ultrasound signals indicate vacancy, and that the user device 110 has buffered an adequate amount of CSI and ultrasound data to accurately calculate the parameter(s) for tuning the ultrasound presence detection module 140 and/or presence determination module 160. The ultrasound calibration module 150 then determine statistical parameters for the ultrasound presence detection module 140 to use during the inference phase to distinguish motion and noise in USPD data.

After starting at step 455, the method 450 may include waiting (460) for an indication of vacancy from the Wi-Fi presence detection module 130. Upon receiving an indication of vacancy, the method 450 may include determining (465) whether the duration of the vacancy determined based on Wi-Fi CSI has been longer than the duration of the vacancy determined based on USPD. It may take the Wi-Fi presence detection module 130 longer than the ultrasound presence detection module 140 to make a confident determination regarding presence/vacancy; thus, the system 100 impose this condition to ensure that the USPD data is suitable for tuning the presence determination module 160. If not ("No" at 465), the method 450 may return to the step 460 and wait for the next indication of vacancy from the Wi-Fi presence detection module 130. If so ("Yes" at 465), the method 450 may proceed to step 470.

The method 450 may include determining (470) whether it has been more than n minutes since the last ultrasound-determined vacancy. This may prevent the method 450 from entering the learning phase too frequently and thus taxing resources of the system 100. In various implementations, the value n may be set to several minutes, several hours, several days, etc. If it has not been more than n minutes since the last ultrasound-determined vacancy ("No" at 470), the method 450 may return to the step 460 and wait for the next indication of vacancy from the Wi-Fi presence detection module 130. If it has been more than n minutes since the last ultrasound-determined vacancy ("Yes" at 470), the method 450 may proceed to determining (475) a threshold probability for identifying USPD events of interest (e.g., the threshold 411). The method 450 may include identifying (480) events exceeding the threshold (e.g., events 413, 423, 433, etc.). The method 485 may calculate the mean and variance of the times between consecutive events (e.g., time gaps 414). The ultrasound calibration module 150 may send the statistical parameters to the presence determination module 160 to use during the inference phase to distinguish USPD module outputs corresponding to motion from those corresponding to noise.

In various implementations, certain stages of the method 450 may be modified, repeated, omitted, performed in a different order, and/or performed partially or wholly in parallel with other stages of the method 450.

Figure 5:
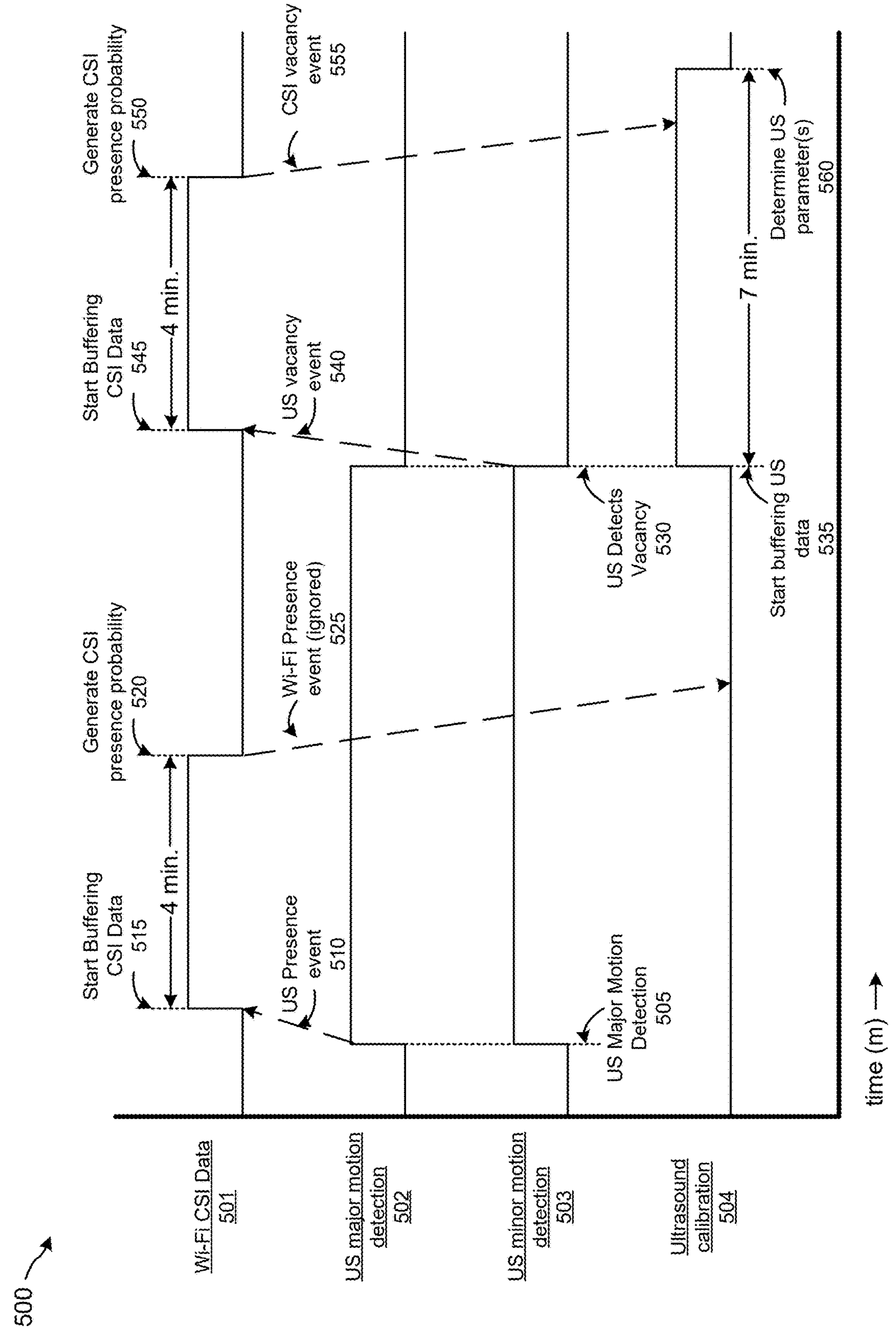
FIG. 5 is a timing diagram illustrating example operation of the system, according to embodiments of the present disclosure.

FIG. 5 is a timing diagram 500 illustrating example operation of the system, according to embodiments of the present disclosure. The timing diagram 500 shows relative timing of activity(ies) related to Wi-Fi CSI data 501, ultrasound major motion detection 502, ultrasound minor motion detection 503, and ultrasound calibration 504. The timing diagram 500 begins with the system 100 commencing (or currently in) an inference phase. When the ultrasound presence detection module 140 detects a major motion event 505, it may output an ultrasound presence event 510, and the system 100 may begin buffering CSI data 515 for a period of time (e.g., one to several minutes). FIG. 5 illustrates collecting CSI data for 4 minutes, but in various implementations the system 100 may collect data for a shorter or longer period of time. At the end of the period, the system 100 may generate a CSI presence probability 520 and generate a Wi-Fi presence event 525; however, the system 100 may continue to generate a presence detected indication if USPD continues to detect movement.

When the system 100 detects vacancy 530 based on ultrasound data, it may generate an ultrasound vacancy event 540, causing the system 100 to commence a learning phase. The system 100 may start buffering ultrasound data 535 and buffering CSI data 545 for a period of time (e.g., one to several minutes). FIG. 5 illustrates buffering CSI and ultrasound data for 4 minutes, but in various implementations the system 100 may collect data for a shorter or longer period of time. At the end of the period, the system 100 may generate a CSI presence probability 550 and generate a Wi-Fi vacancy event 555. If the Wi-Fi presence event indicates a sufficient probability of vacancy during the period corresponding to the buffered data, the ultrasound calibration module 150 may process the buffered ultrasound data to determine the parameter(s) 560 for tuning/calibrating USPD using one or more of the techniques described herein. The system 100 may return to an inference phase and apply the learned USPD parameter(s). In some implementations, the system 100 may return to a learning phase at each confirmed vacancy (e.g., of a duration sufficient for collecting data for USPD tuning). In some implementations, the system 100 may wait a period of time (e.g., several minutes, several hours, several days) before reentering a learning phase to update the USPD parameter(s).

Figure 6A:
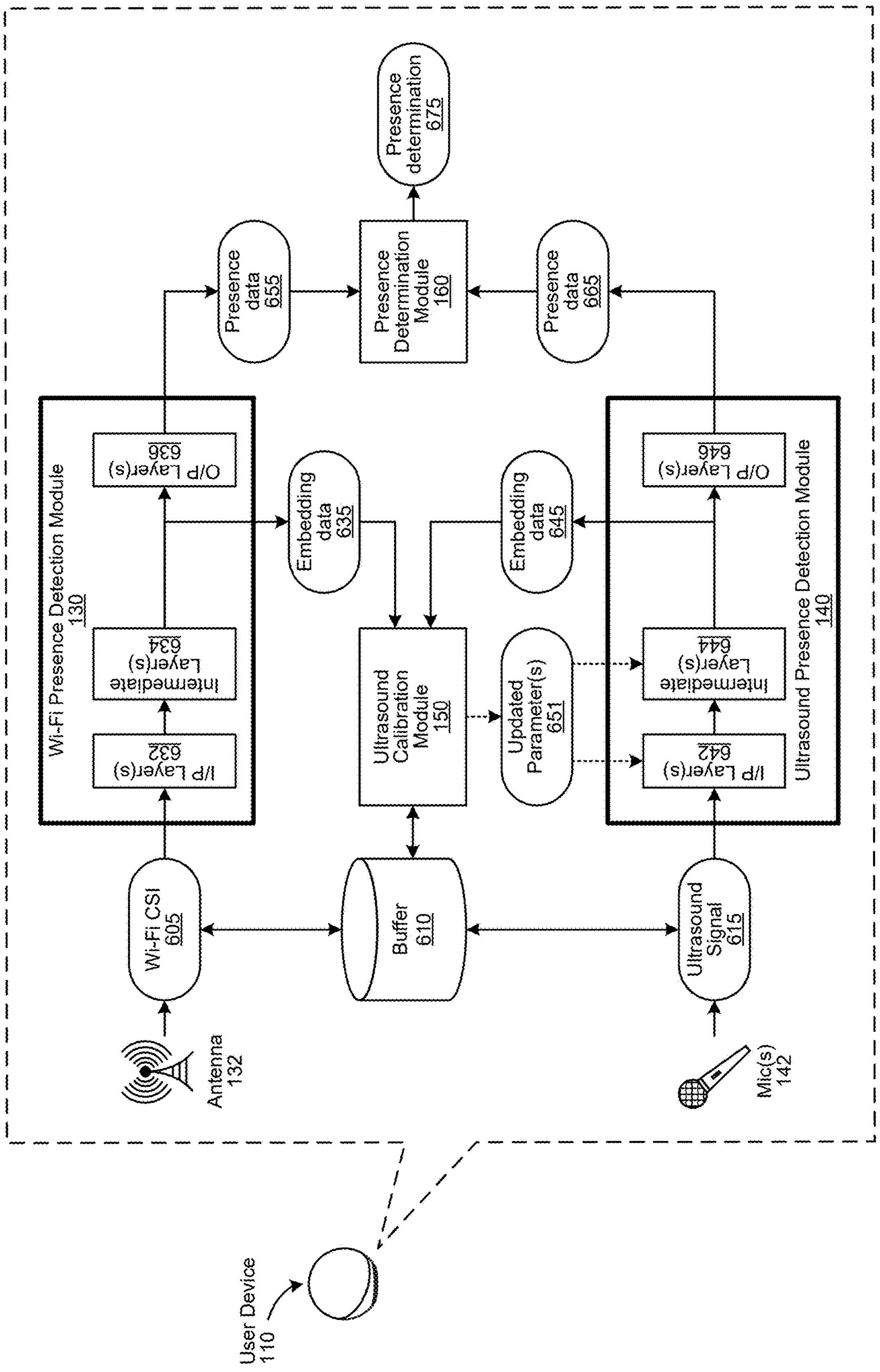
FIG. 6A is a conceptual diagram illustrating the operation of a third example implementation of a presence detection technique, according to embodiments of the present disclosure.

FIG. 6A is a conceptual diagram illustrating the operation of a third example implementation of a presence detection technique, according to embodiments of the present disclosure. In some implementations, the system 100 may include machine learning models for processing signals to detect motion events. For example, the Wi-Fi presence detection module 130 may include a first neural network having one or more input layers 632, one or more intermediate layers 634, and one or more output layers 636. Similarly the ultrasound presence detection module 140 may include a second neural network having one or more input layers 642, one or more intermediate layers 644, and one or more output layers 646. The neural networks may include, for example, one or more convolutional layers, recurrent neural network (RNN) blocks, and/or one or more transformer blocks. For example, one or both of the neural networks may be convolutional neural network (CNN) configured to classify an input signal as likely corresponding to motion or noise. A CNN may process the buffered data as a batch. In another example, one or both neural networks may be an RNN configured to process the buffered data sequentially (e.g., a long short-term memory (LSTM), gated recurrent unit (GRU), etc.). In another example, one or both neural networks may have a transformer architecture configured to process the buffered data sequentially. In yet another example, one or both neural networks may include a combination of convolutional and recurrent processes (e.g., a conformer architecture). In some implementations, other neural network architectures or combinations of architectures may be used. The neural network(s) may be trained to classify (or otherwise indicate whether) an input signal as likely corresponding to motion or noise by using a reliable indication of presence and/or vacancy as a ground truth, calculating a loss based on a comparison of an output to the ground truth, and updating one or more parameters of the network accordingly. The neural network of the ultrasound presence detection module 140 may be pre-trained in this manner and/or trained by knowledge distillation from the Wi-Fi presence detection module 130.

Knowledge distillation may refer to the process of transferring knowledge from a larger model to a smaller one. In the case of the system 100, however, there is no requirement that the Wi-Fi presence detection model be of any particular size and/or architecture relative to the USPD model or generally. Rather, the Wi-Fi presence detection model is simply used as a trustworthy generator of embeddings that may be used to train the USPD model. In this manner, the knowledge distillation process may be used to transfer an embedding space of the Wi-Fi presence detection model to an initialized and/or pre-trained USPD model.

In an example operation, when the system 100 commences a learning phase, it may buffer Wi-Fi CSI data 605 and ultrasound signal data 615 in a buffer 610. The buffer may be, for example a first-in, first-out (FIFO) buffer configured to collect several minutes' worth of data. If the system 100 determines the buffer 610 has buffered enough data to tune the USPD parameter(s), the system 100 may cause the Wi-Fi presence detection module 130 and the ultrasound presence detection module 140 to process the data. During the inference phase, the modules may output CSI presence data 655 and USPD presence data 665, respectively, which the presence determination module 160 may use to make a final presence/vacancy determination to be output as a presence determination 675. During the learning phase, however, the ultrasound calibration module 150 may receive embeddings output by an intermediate layer of the models. The embedding data may represent a raw vector, score, and/or probability representing the model's internal processing of the data prior to making a final classification of the data as corresponding to motion or no motion (e.g., noise). Thus, the embedding data may include more information than the CSI presence data 655 and/or USPD presence data 665. For example, the embedding data 635 may include a vector of floating-point presence probabilities (rather than a scalar probability or binary determination).

The ultrasound calibration module 150 may receive embedding data 635 from the Wi-Fi presence detection module 130 and embedding data 645 from the ultrasound presence detection module 140. The ultrasound calibration module 150 may compare the USPD embedding data 645 to the CSI embedding data 635 (e.g., using a cross-entropy loss or other loss function), determine updated parameter(s) 651, and update the corresponding parameter(s) of the layers 642 and/or 644.

In some implementations, the system 100 may perform such training during a learning phase using the currently buffered data. In some implementations, the system 100 may have (or receive) a training dataset consisting of stored CSI and ultrasound data corresponding to multiple or many periods of vacancy, which the system 100 may use for batch training of the USPD model.

Following the learning phase, the system 100 may return to an inference phase, during which the presence determination module 160 may receive and process the CSI motion data 655, the USPD motion data 665 to make a final presence/vacancy determination, which the presence determination module 160 may output as a presence determination 675 (e.g., a "presence detected" or "vacancy detected").

In some implementations, the system 100 may include multiple user devices 110 (which may or may not correspond to the same account profile), and may aggregate model updates from the user devices 110 to, for example, generate a global update of USPD models. In this manner, the system 100 may improve the accuracy/reliability of the models over what may be achievable based on updating models individually based on local data.

Figure 6B:
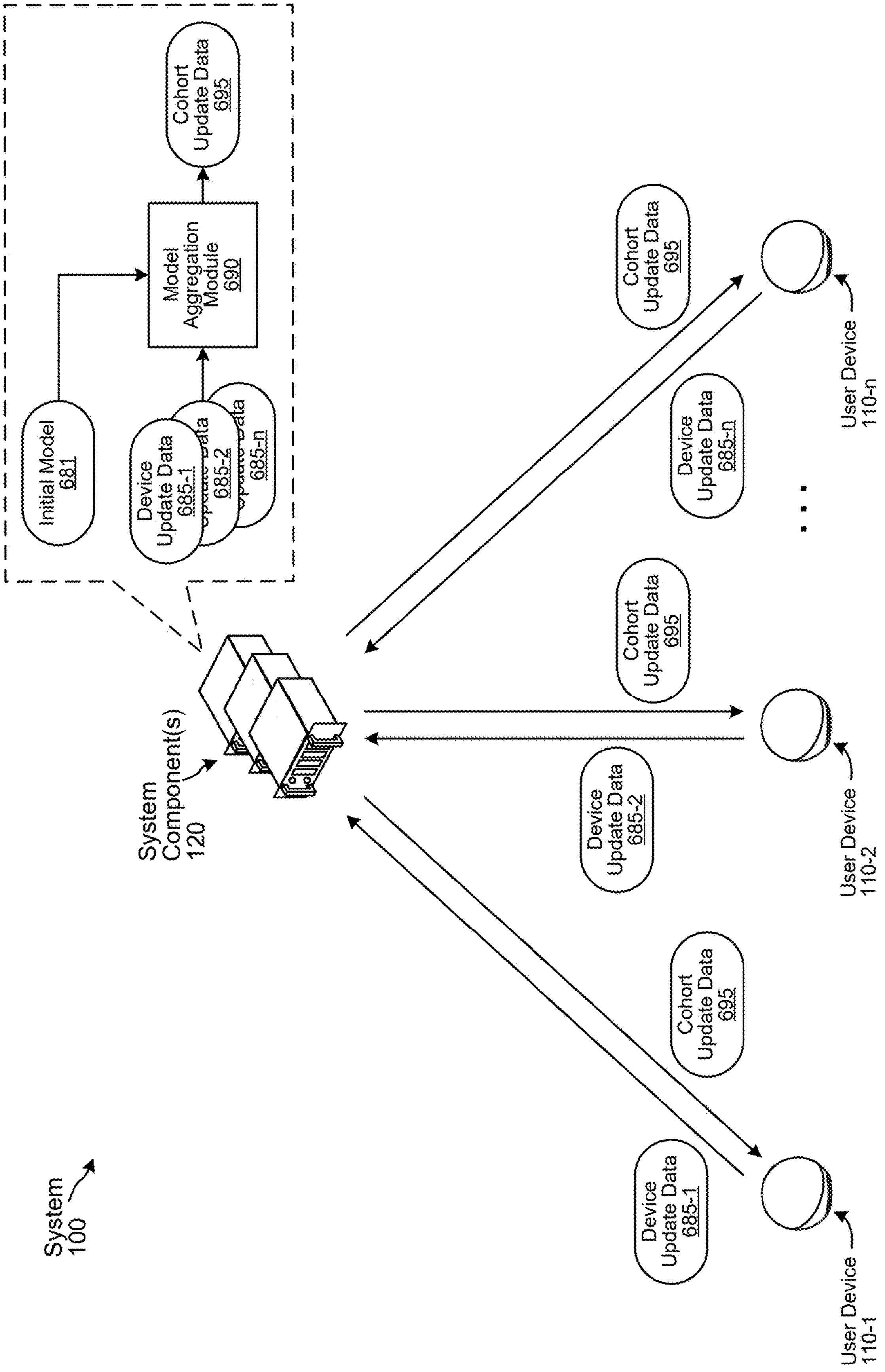
FIG. 6B is a conceptual diagram illustrating example operations for aggregating learned parameters from multiple user devices, according to embodiments of the present disclosure.

FIG. 6B is a conceptual diagram illustrating example operations for aggregating learned parameters from multiple user devices 110, according to embodiments of the present disclosure. The system 100 may use federated learning techniques to combine model updates from one or more cohorts of user device 110 to generate a shared (e.g., global)

update for those user devices 110. The system 100 may create a cohort based on one or more factors including device type, hardware capabilities, hardware version, primary use (e.g., public versus semi-private versus private, etc.), characteristics of the ambient area (e.g., similarity of background noise characteristics), etc. The system 100 may collect device update data 685 from the user devices 110 in the cohort, determine cohort update data 695, and return the cohort update data 695 to the user devices 110.

The system 100 may begin with an initial model 681, which the one or more system component(s) 120 may distribute to user devices 110-1, 110-2, . . . 110-*n* of the cohort(s). The user devices 110 may run the model to make presence/vacancy decisions based on ultrasound data captured by the respective devices. The user devices 110 may determine device update data 685 based on on-device training of the USPD model by applying the tuning and calibration techniques described previously on Wi-Fi data and ultrasound data captured by that device, and return the device update data 685-1, 685-2, . . . 685-*n*, respectively, to the system component(s) 120. The device update data 685 may include one or more of the loss data calculated by the loss function used for training the USPD model, gradients for updating the model parameters, and/or updated model parameters 651. The user devices 110 may encrypt or otherwise transform the device update data 685 for privacy purposes, and the system component(s) 120 may return cohort update data 695 in a secure manner as well.

A model aggregation module 690 of the system component(s) 120 may receive and aggregate the device update data 685 to determine the cohort update data 695. The model aggregation module 690 may include software and/or hardware configured to determine cohort update data 695 representing the aggregation of the device update data 685. For example, the model aggregation module 690 may attempt to optimize an objective function $$f(x_1, \ldots , x_K) = \frac{1}{K}\sum_{i=1}^{K} f_i(x_i)$$

Where K is the number of nodes, $x_i$ are the weights of the USPD model of the user device 110-*i*, and $f_i$ is node i's local objective function with respect to data processed by the user device 110-*i*. The model aggregation module 690 may attempt to achieve consensus on $x_i$ such that $x_1, \ldots, x_K$ converge to a common x, which the model aggregation module 690 may distribute to the user devices 110 in the cohort update data 695.

The system 100 may return the cohort update data 695 to the user devices 110. The user devices 110 may update their local USPD models and use the model to process the same data used to generate the previous round of device update data 685 and/or to make presence/vacancy determinations using subsequently captured ultrasound data. In some implementations, a user device 110 may validate the device update data 685 by, for example, processing a validation dataset to determine whether the device update data 685 corresponds to improved performance relative to the previous version of a USPD model. In some implementations, a user device 110 may replace the current USPD model with one corresponding to the device update data 685. In some implementations, a user device 110 may determine a hybrid model representing a combination of parameters of the current USPD model and parameters corresponding to the device update data 685 (e.g., by pooling or averaging the current model parameters and device update data 685). The system 100 may repeat this process for a predetermine number of iterations and/or until model accuracy satisfies a condition, and return final cohort update data 695 to the user devices. The system 100 may repeat the process occasionally or periodically to continue improving the local USPD models over time.

Figure 8:
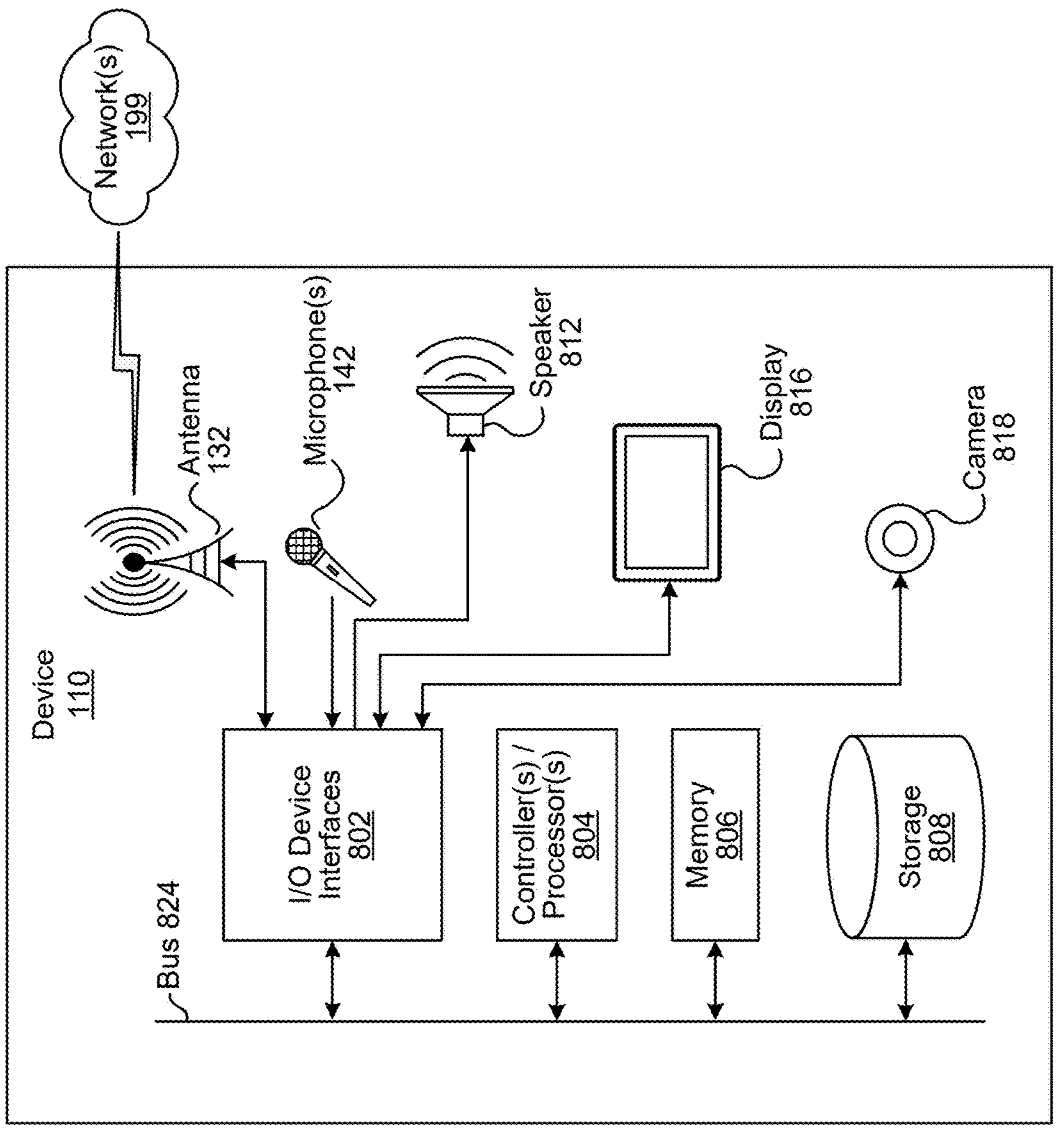
FIG. 8 is a block diagram conceptually illustrating example components of a device, according to embodiments of the present disclosure.

The system 100 may operate using various components as described in FIG. 7. The various components may be located on same or different physical devices. Communication between various components may occur directly or across a network(s) 199 (e.g., as shown in FIGS. 8 through 10). The user device 110 may include audio capture component(s), such as a microphone 142 or array of microphones 142 of a user device 110, that captures audio 710 and creates corresponding audio data 711. Once speech is detected in audio data 711, the user device 110 may determine if the speech is directed at the user device 110/system component(s) 120. In at least some embodiments, such determination may be made using a wakeword detection component 720. The wakeword detection component 720 may be configured to detect various wakewords. In at least some examples, each wakeword may correspond to a name of a different digital assistant. An example wakeword/digital assistant name is "Alexa." In another example, input to the system may be in form of text data 713, for example as a result of a user typing an input into a user interface of user device 110. Other input forms may include indication that the user has pressed a physical or virtual button on user device 110, the user has made a gesture, etc. The user device 110 may also capture images using camera(s) of the user device 110 and may send image data 721 representing those image(s) to the system component(s). The image data 721 may include raw image data or image data processed by the user device 110 before sending to the system component(s). The image data 721 may be used in various manners by different components of the system to perform operations such as determining whether a user is directing an utterance to the system, interpreting a user command, responding to a user command, etc. In some embodiments, the user input data (e.g., audio data 711, image data 721, text data 713, etc.) may include one or more the audio 710, the audio data 711, the text data 713 and the image data 721.

The wakeword detection component 720 of the user device 110 may process the audio data, representing the audio 710, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 710, is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without HMM being involved. Such an architecture may estimate the posteriors of wakewords with context data, either by stacking frames within a context window for DNN, or using an RNN. Follow-on posterior threshold tuning or smoothing is applied for decision making. Other techniques for wakeword detection, such as those known in the art, may also be used.

Once the wakeword is detected by the wakeword detection component 720 and/or input is detected by an input detector, the user device 110 may "wake" and begin transmitting audio data 711, representing the audio 710, to the system component(s) 120. The audio data 711 may include data corresponding to the wakeword; in other embodiments, the portion of the audio corresponding to the wakeword is removed by the user device 110 prior to sending the audio data 711 to the system component(s) 120. In the case of touch input detection or gesture-based input detection, the audio data may not include a wakeword.

In some implementations, the system 100 may include more than one system component(s) 120. The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 720 may result in sending audio data to system component(s) 120*a* for processing while detection of the wakeword "Computer" by the wakeword detector may result in sending audio data to system component(s) 120*b* for processing. The system may have a separate wakeword and system for different skills/systems (e.g., "Castle Adventure" for a game play skill/system component(s) 120*c*) and/or such skills/systems may be coordinated by one or more skill component(s) 754 of one or more system component(s) 120.

The user device 110/system component(s) 120 may also include a system directed input detector 785. The system directed input detector 785 may be configured to determine whether an input to the system (for example speech, a gesture, etc.) is directed to the system or not directed to the system (for example directed to another user, etc.). The system directed input detector 785 may work in conjunction with the wakeword detection component 720. If the system directed input detector 785 determines an input is directed to the system, the user device 110 may "wake" and begin sending captured data for further processing. If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 785 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 785 is determining whether an input is potentially device directed. For example, the system may output an orange indicator while considering an input and may output a green indicator if a system directed input is detected. Other such configurations are possible.

Upon receipt by the system component(s) 120, the audio data 711 may be sent to an orchestrator component 730 and/or the language model orchestrator component 790. The orchestrator component 730 may include memory and logic that enables the orchestrator component 730 to transmit various pieces and forms of data to various components of the system, as well as perform other operations as described herein. In some embodiments, the orchestrator component 730 may optionally be included in the system component(s) 120. In embodiments where the orchestrator component 730 is not included in the system component(s) 120, the audio data 711 may be sent directly to the language model orchestrator component 790. Further, in such embodiments, each of the components of the system component(s) 120 may be configured to interact with the language model orchestrator component 790, the action plan execution component 765, the API provider component, and/or other component(s).

In some embodiments, the system component(s) 120 may include an arbitrator component 782, which may be configured to determine whether the orchestrator component 730 and/or the language model orchestrator component 790 are to process with respect to user input data. In some embodiments, the language model orchestrator component 790 may be selected to process with respect to the audio data 711 only if the user 5 associated with the audio data 711 (or the user device 110 that captured the audio 710) has previously indicated that the language model orchestrator component 790 may be selected to process with respect to user inputs received from the user 5.

In some embodiments, the arbitrator component 782 may determine the orchestrator component 730 and/or the language model orchestrator component 790 are to process with respect to the audio data 711 based on metadata associated with the audio data 711. For example, the arbitrator component 782 may be a classifier configured to process a natural language representation of the audio data 711 (e.g., output by the ASR component 750) and classify the corresponding user input as to be processed by the orchestrator component 730 and/or the language model orchestrator component 790. For further example, the arbitrator component 782 may determine whether the device from which the audio data 711 is received is associated with an indicator representing the audio data 711 is to be processed by the orchestrator component 730 and/or the language model orchestrator component 790. As an even further example, the arbitrator component 782 may determine whether the user (e.g., determined using data output from the user recognition component 795) from which the audio data 711 is received is associated with a user profile including an indicator representing the audio data 711 is to be processed by the orchestrator component 730 and/or the language model orchestrator component 790. As another example, the arbitrator component 782 may determine whether the audio data 711 (or the output of the ASR component 750) corresponds to a request representing that the audio data 711 is to be processed by the orchestrator component 730 and/or the language model orchestrator component 790 (e.g., a request including "let's chat" may represent that the audio data 711 is to be processed by the language model orchestrator component 790).

In some embodiments, if the arbitrator component 782 is unsure (e.g., a confidence score corresponding to whether the orchestrator component 730 and/or the language model orchestrator component 790 is to process is below a threshold), then the arbitrator component 782 may send the audio data 711 to both of the orchestrator component 730 and the language model orchestrator component 790. In such embodiments, the orchestrator component 730 and/or the language model orchestrator component 790 may include further logic for determining further confidence scores during processing representing whether the orchestrator component 730 and/or the language model orchestrator component 790 should continue processing, as is discussed further herein below.

The arbitrator component 782 may send the audio data 711 to an ASR component 750. In some embodiments, the component selected to process the audio data 711 (e.g., the orchestrator component 730 and/or the language model orchestrator component 790) may send the audio data 711 to the ASR component 750. The ASR component 750 may transcribe the audio data 711 into text data. The text data output by the ASR component 750 represents one or more than one (e.g., in the form of an N-best list) ASR hypotheses representing speech represented in the audio data 711. The ASR component 750 interprets the speech in the audio data 711 based on a similarity between the audio data 711 and pre-established language models. For example, the ASR component 750 may compare the audio data 711 with models for sounds (e.g., acoustic units such as phonemes, senons, phones, etc.) and sequences of sounds to identify words that match the sequence of sounds of the speech represented in the audio data 711. The ASR component 750 sends the text data generated thereby to the arbitrator component 782, the orchestrator component 730, and/or the language model orchestrator component 790. In instances where the text data is sent to the arbitrator component 782, the arbitrator component 782 may send the text data to the component selected to process the audio data 711 (e.g., the orchestrator component 730 and/or the language model orchestrator component 790). The text data sent from the ASR component 750 to the arbitrator component 782, the orchestrator component 730, and/or the language model orchestrator component 790 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 730 may cause a NLU component (not shown) to perform processing with respect to the ASR data generated by the ASR component 750. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 110, the system component(s) 120, a skill/app component 754, a skill system component(s) 725, etc.) to execute the intent. For example, if the ASR data corresponds to "play the $5^{th}$ Symphony by Beethoven," the NLU component may determine an intent that the system output music and may identify "Beethoven" as an artist/composer and "$5^{th}$ Symphony" as the piece of music to be played. For further example, if the ASR data corresponds to "what is the weather," the NLU component may determine an intent that the system output weather information associated with a geographic location of the device 110. In another example, if the ASR data corresponds to "turn off the lights," the NLU component may determine an intent that the system turn off lights associated with the device 110 or the user 5. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 730. The orchestrator component 730 may forward the NLU results data to a skill component(s) 754. If the NLU results data includes a single NLU hypothesis, the NLU component and the orchestrator component 730 may direct the NLU results data to the skill component(s) 754 associated with the NLU hypothesis. If the NLU results data includes an N-best list of NLU hypotheses, the NLU component and the orchestrator component 730 may direct the top scoring NLU hypothesis to a skill component(s) 754 associated with the top scoring NLU hypothesis. The system may also include a post-NLU ranker which may incorporate other information to rank potential interpretations determined by the NLU component.

In some embodiments, after determining that the orchestrator component 730 and/or the language model orchestrator component 790 should process with respect to the user input, the arbitrator component 782 may be configured to periodically determine whether the orchestrator component 730 and/or the language model orchestrator component 790 should continue processing with respect to the user input. For example, after a particular point in the processing of the orchestrator component 730 (e.g., after performing NLU, prior to determining a skill component 754 to process with respect to the user input, prior to performing an action responsive to the user input, etc.) and/or the language model orchestrator component 790 (e.g., after selecting a task to be completed, after receiving the action response data from the one or more components, after completing a task, prior to performing an action responsive to the user input, etc.) the orchestrator component 730 and/or the language model orchestrator component 790 may query the arbitrator component 782 has determined that the orchestrator component 730 and/or the language model orchestrator component 790 should halt processing with respect to the user input. As discussed above, the system 100 may be configured to stream portions of data associated with processing with respect to a user input to the one or more components such that the one or more components may begin performing their configured processing with respect to that data as soon as it is available to the one or more components. As such, the arbitrator component 782 may cause the orchestrator component 730 and/or the language model orchestrator component 790 to begin processing with respect to a user input as soon as a portion of data associated with the user input is available (e.g., the ASR data, context data, output of the user recognition component 795. Thereafter, once the arbitrator component 782 has enough data to perform the processing described herein above to determine whether the orchestrator component 730 and/or the language model orchestrator component 790 is to process with respect to the user input, the arbitrator component 782 may inform the corresponding component (e.g., the orchestrator component 730 and/or the language model orchestrator component 790) to continue/halt processing with respect to the user input at one of the logical checkpoints in the processing of the orchestrator component 730 and/or the language model orchestrator component 790.

A skill system component(s) 725 may communicate with a skill/app component(s) 754 within the system component(s) 120 directly with the orchestrator component 730 and/or the action plan execution component 765, or with other components. A skill system component(s) 725 may be configured to perform one or more actions. An ability to perform such action(s) may sometimes be referred to as a "skill." That is, a skill may enable a skill system component(s) 725 to execute specific functionality in order to provide data or perform some other action requested by a user. For example, a weather service skill may enable a skill system component(s) 725 to provide weather information to the system component(s) 120, a car service skill may enable a skill system component(s) 725 to book a trip with respect to a taxi or ride sharing service, an order pizza skill may enable a skill system component(s) 725 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill/app component 754 dedicated to interacting with the skill system component(s) 725. Unless expressly stated otherwise, reference to a skill, skill device, or skill component may include a skill/app component 754 operated by the system component(s) 120 and/or skill/app operated by the skill system component(s) 725. Moreover, the functionality described herein as a skill or skill may be referred to using many different terms, such as an action, bot, app, or the like. The skill component 754 and or skill system component(s) 725 may return output data to the orchestrator component 730.

The system component(s) includes a SSG component 756. The SSG component 756 may generate audio data (e.g., synthesized speech) from text data, text embeddings, text tokens, audio tokens, audio embeddings, etc., using one or more different methods. Data input to the SSG component 756 may come from a skill/app component 754, the orchestrator component 730, the action plan execution component 765, or another component of the system. In one method of synthesis called unit selection, the SSG component 756 matches data against a database of recorded speech. The SSG component 756 selects matching units of recorded speech and concatenates the units together to form audio data. In another method of synthesis called parametric synthesis, the SSG component 756 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 711 representing the commands to the system component(s) 120 for processing, after which the system component(s) 120 may return output data that can cause the user device 110 to engage its camera.

The system component(s) 120/the user device 110 may include a user recognition component 795 that recognizes one or more users using a variety of data. However, the disclosure is not limited thereto, and the user device 110 may include the user recognition component 795 instead of and/or in addition to the system component(s) 120 without departing from the disclosure.

The user recognition component 795 may take as input the audio data 711 and/or text data output by the ASR component 750. The user recognition component 795 may perform user recognition by comparing audio characteristics in the audio data 711 to stored audio characteristics of users. The user recognition component 795 may also perform user recognition by comparing biometric data (e.g., fingerprint data, iris data, etc.), received by the system in correlation with the present user input, to stored biometric data of users assuming user permission and previous authorization. The user recognition component 795 may further perform user recognition by comparing image data (e.g., including a representation of at least a feature of a user), received by the system in correlation with the present user input, with stored image data including representations of features of different users. The user recognition component 795 may perform additional user recognition processes, including those known in the art.

The user recognition component 795 determines scores indicating whether user input originated from a particular user. For example, a first score may indicate a likelihood that the user input originated from a first user, a second score may indicate a likelihood that the user input originated from a second user, etc. The user recognition component 795 also determines an overall confidence regarding the accuracy of user recognition operations.

Output of the user recognition component 795 may include a single user identifier corresponding to the most likely user that originated the user input. Alternatively, output of the user recognition component 795 may include an N-best list of user identifiers with respective scores indicating likelihoods of respective users originating the user input. The output of the user recognition component 795 may be used to inform processing of the arbitrator component 782, the orchestrator component 730, and/or the language model orchestrator component 790 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 770 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more internet protocol (IP) addresses, medium access control (MAC) addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of components (e.g., responding component(s) such as skills/apps 754, language model-based agents, knowledge bases, components for a particular domain, etc.) that the user has enabled. When a user enables a component, the user is providing the system component(s) with permission to allow the component to execute with respect to the user's inputs. If a user does not enable a component, the system component(s) may not invoke that component to execute with respect to the user's inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 770 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 7 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure.

In at least some embodiments, the system component(s) 120 may receive the audio data 711 from the user device 110, to recognize speech corresponding to a spoken input in the received audio data 711, and to perform functions in response to the recognized speech. In at least some embodiments, these functions involve sending directives (e.g., commands), from the system component(s) to the user device 110 (and/or other user devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may direct the user device 110 to output an audible response (e.g., using SSG processing performed by an on-device SSG component) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

In at least some embodiments, the user device 110, may send the audio data 711 to the wakeword detection component 720. If the wakeword detection component 720 detects a wakeword in the audio data 711, the wakeword detection component 720 may send an indication of such detection to the user device 110. In response to receiving the indication, the audio data 711 may be sent to the system component(s) 120 and/or the ASR component of the user device 110. The wakeword detection component 720 may also send an indication, to the user device 110, representing a wakeword was not detected. In response to receiving such an indication, the audio data 711 may not be sent to the system component(s) 120, and the user device 110 may prevent the ASR component of the user device 110 from further processing the audio data 711. In this situation, the audio data 711 can be discarded.

In some embodiments, the user device 110 may include some or all of the components illustrated in FIG. 7 and/or discussed herein above with respect to the system component(s) 120. In other embodiments, the components illustrated in FIG. 7 and/or discussed herein with respect to the system component(s) 120 may be distributed across the user device 110 and the system component(s) 120.

In at least some embodiments, the components of the user device 110 (e.g., on-device components) may not have the same capabilities as the components of the system component(s) 120. For example, on-device components may be configured to generate a response to only a subset of the natural language user inputs that may be handled by the system component(s) 120. For example, such subset of natural language user inputs may correspond to local-type natural language user inputs, such as those controlling devices or components associated with a user's home. In such circumstances the on-device components may be able to more quickly interpret and respond to a local-type natural language user input, for example, than processing that involves the system component(s). If the user device 110 attempts to process a natural language user input for which the on-device components are not necessarily best suited, the language processing results determined by the user device 110 may indicate a low confidence or other metric indicating that the processing by the user device 110 may not be as accurate as the processing done by the system component(s) 120.

In some embodiments, the system component(s) 120 and the user device 110 may process as described herein to generate responses to the user input corresponding to the audio data 711. The system component(s) 120 may send the response to the user device 110 and the user device 110 may determine whether to output the response generated by the system component(s) 120 or the response generated by the user device 110. In some embodiments, the system component(s) 120 may be configured to perform a portion of the processing described herein, such as a portion of processing not performable by the user device 110 and send the result of such processing to the user device 110. The user device 110 may be configured to determine whether to use the result to complete processing to generate the response to the user device 110.

In at least some embodiments, the user device 110 may include, or be configured to use, one or more skill/app components that may operate similarly to the skill/app component(s) 754. The skill/app component(s) on the user device 110 may correspond to one or more domains that are used in order to determine how to act on a spoken input in a particular way, such as by outputting a directive that corresponds to the determined intent, and which can be processed to implement the desired operation. The skill component(s) installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the user device 110 may be in communication with one or more skill system component(s) 725. For example, a skill system component(s) 725 may be located in a remote environment (e.g., separate location) such that the user device 110 may only communicate with the skill system component(s) 725 via the network(s) 199. However, the disclosure is not limited thereto. For example, in at least some embodiments, a skill system component(s) 725 may be configured in a local environment (e.g., home server and/or the like) such that the user device 110 may communicate with the skill system component(s) 725 via a private network, such as a local area network (LAN).

FIG. 8 is a block diagram conceptually illustrating a device 110 that may be used with the system. FIG. 9 is a block diagram conceptually illustrating example components of a system component 120 and/or a skill system component(s) 725, such as the natural language command processing system component(s), which may assist with ASR, NLU, and/or other processing of the system 100. A system (120/725) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) may be located remotely from the device 110 as its operations may not require proximity to the user. The server/system component(s) may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/725) may be included in the overall system 100 of the present disclosure, such as one or more natural language processing system component(s) 120 for performing ASR processing, one or more natural language processing system component(s) 120 for performing NLU processing, one or more skill system component(s) 725, etc. In operation, each of these systems may include computer-readable and computer-executable instructions that reside on the respective device (120/725), as will be discussed further below.

Each of these devices (110/120/725) may include one or more controllers/processors (804/904), which may each include a central processing unit (CPU) for processing data and computer-readable instructions, and a memory (806/906) for storing data and instructions of the respective device. The memories (806/906) may individually include volatile random-access memory (RAM), non-volatile read only memory (ROM), non-volatile magnetoresistive memory (MRAM), and/or other types of memory. Each device (110/120/725) may also include a data storage component (808/908) for storing data and controller/processor-executable instructions. Each data storage component (808/908) may individually include one or more non-volatile storage types such as magnetic storage, optical storage, solid-state storage, etc. Each device (110/120/725) may also be connected to removable or external non-volatile memory and/or storage (such as a removable memory card, memory key drive, networked storage, etc.) through respective input/output device interfaces (802/902).

Computer instructions for operating each device (110/120/725) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/725) includes input/output device interfaces (802/902). A variety of components may be connected through the input/output device interfaces (802/902), as will be discussed further below. Additionally, each device (110/120/725) may include an address/data bus (824/924) for conveying data among components of the respective device. Each component within a device (110/120/725) may also be directly connected to other components in addition to (or instead of) being connected to other components across the bus (824/924).

Referring to FIG. 8, the device 110 may include input/output device interfaces 802 that connect to a variety of components such as an audio output component such as one or more loudspeakers 812, a wired headset or a wireless headset (not illustrated), or other component capable of outputting audio. In addition to the loudspeaker(s) 812 operating in the audible-frequency range (e.g., outputting audio frequencies typically detectable by the human ear), a user device may include one or more audio transducers such as one or more ultrasonic transmitters for outputting an ultrasonic signal for performing USPD as described herein. The device 110 may also include an audio capture component. The audio capture component may be, for example, a microphone 142 or array of microphones 142, a wired headset or a wireless headset (not illustrated), etc. If an array of microphones is included, approximate distance to a sound's point of origin may be determined by acoustic localization based on time and amplitude differences between sounds captured by different microphones of the array. In addition to the microphone(s) 142 operating in the audible-frequency range, a user device 110 may include one or more ultrasonic receivers configured to receive ultrasound signals (e.g., outside of the range of typical human hearing). The ultrasonic transmitter(s) and receiver(s) may make up an ultrasonic sensor system of the user device 110, and may be used to perform USPD functions as described herein. The device 110 may additionally include a display 816 for displaying content. The device 110 may further include a camera 818.

Via antenna(s) 132, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 4G network, 5G network, etc. A user device 110 may use one or more of the antenna(s) 132 to receive a wireless signal used for CSI-based presence (e.g., movement) detection. CSI may be calculated using one of the I/O device interfaces 802 and/or a dedicated component of the user device 110. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

Referring to FIG. 9, the system component(s) 120 may include an input/output device interface 802, one or more controllers/processors 804, a memory 806, and one or more data storage components 808. The components of the device(s) 110, the natural language command processing system component(s) 120, or a skill system component(s) 725 may include their own dedicated processors, memory, and/or storage. Alternatively, one or more of the components of the device(s) 110, the natural language command processing system component(s), or a skill system component(s) 725 may utilize the I/O interfaces (802/902), processor(s) (804/904), memory (806/906), and/or storage (808/908) of the device(s) 110, natural language command processing system component(s), or the skill system component(s) 725, respectively. Thus, the ASR component 750 may have its own I/O interface(s), processor(s), memory, and/or storage; the NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and a skill system component(s) 725, as described herein, are illustrative, and may be located as a stand-alone device or may be included, in whole or in part, as a component of a larger device or system. As can be appreciated, a number of components may exist either on a system component(s) and/or on device 110. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 10, multiple devices (110*a*-110*n*, 120, 725) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart TV 110*g*, a washer/dryer 110*h*, a refrigerator 110*i*, a microwave 110*j*, autonomously motile device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 725, and/or others. The support devices may connect to the network(s) 199 through a wired connection or wireless connection. Networked devices may capture audio using one-or-more built-in or connected microphones 142 or other audio capture devices, with processing performed by ASR components, NLU components, or other components of the same device or another device connected via the network(s) 199, such as the ASR component 750, the NLU component, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first data representing channel state information corresponding to a Wi-Fi signal received by a first device from a second device during a first interval of time;

determining that the first data indicates a vacancy of a first area corresponding to the first device and the second device;

receiving, from an ultrasound sensor corresponding to the first device, second data corresponding to the first interval of time;

determining, based on the first data and the second data, at least a first parameter for detecting minor motion using the ultrasound sensor;

after determining the first parameter, receiving third data from the ultrasound sensor;

determining that the third data represents at least a first event exceeding a first threshold for detection of major motion;

in response to determining that the third data represents at least a first event exceeding the first threshold, outputting a first indication of presence in a second area corresponding to the first device;

receiving, from the ultrasound sensor, fourth data corresponding to a second interval of time following receipt of the third data, the fourth data representing at least a second event exceeding a second threshold for detection of minor motion;

determining, using the at least first parameter, that the fourth data indicates an absence of motion in the second area during the second interval of time; and in response to determining that the fourth data indicates an absence of motion in the second area during the second interval of time, outputting an indication of vacancy of the second area.

2. The computer-implemented method of claim 1, further comprising:

determining that at least a portion of the fourth data represents a plurality of events exceeding the second threshold without any events exceeding the first threshold; and determining that a number of the plurality of events exceeds the first parameter, wherein:

the first parameter indicates a maximum number of events exceeding the second threshold between events exceeding the first threshold, and determining that the fourth data indicates an absence of motion in the second area during the second interval of time is based on determining that the number exceeds the first parameter.

3. The computer-implemented method of claim 1, further comprising:

identifying, in the fourth data, a first plurality of events exceeding the second threshold;

determining a first mean and a first variance corresponding to intervals between consecutive events in the first plurality of events, wherein the first parameter corresponds to a second mean and a second parameter corresponds to a second variance, the second mean and second variance determined based on a second plurality of events exceeding the second threshold in the second data; and determining, using the first mean, the second mean, the first variance, and the second variance, that the second plurality of events indicates an absence of motion in the second area during the second interval of time.

4. The computer-implemented method of claim 1, further comprising:

processing the first data using a first neural network to determine first embedding data output by a first intermediate layer of the first neural network;

processing the second data using a second neural network to determine second embedding data output by a second intermediate layer of the second neural network; and determining the at least first parameter using the first embedding data and the second embedding data, the at least first parameter corresponding to an updated version of the second neural network.

5. A computer-implemented method comprising:

receiving first data representing channel state information corresponding to a wireless signal received by a first device during a first interval of time;

determining that the first data indicates a vacancy of a first area corresponding to the first device and a second device that transmitted the wireless signal;

receiving, from an ultrasound sensor corresponding to the first device, second data corresponding to the first interval of time;

determining, based on the first data and the second data, at least a first parameter for detecting motion using the ultrasound sensor;

receiving, from the ultrasound sensor, third data corresponding to a second interval of time following the first interval of time, the third data representing at least a first event that exceeds a first threshold for detection of motion;

determining, using the at least first parameter, that the third data indicates an absence of motion in a second area corresponding to the first device during the second interval of time; and in response to determining that the third data indicates an absence of motion in the second area during the second interval of time, outputting a first indication of vacancy of the second area.

6. The computer-implemented method of claim 5, further comprising:

prior to receiving the third data, receiving fourth data from the ultrasound sensor;

determining that the fourth data represents at least a second event exceeding a second threshold for detection of major motion; and in response to determining that the fourth data represents at least a second event exceeding the second threshold:

outputting a second indication of presence in the second area, and observing data received from the ultrasound sensor for representations of events indicating motion.

7. The computer-implemented method of claim 5, further comprising:

after outputting the first indication, receiving fourth data from the ultrasound sensor;

determining that the fourth data represents at least a second event exceeding a second threshold for detection of major motion;

in response to determining that the fourth data represents at least a second event exceeding the second threshold, receiving, from the ultrasound sensor, fifth data corresponding to a third time interval, the third time interval corresponding to a predetermined duration;

determining that the fifth data represents no events exceeding the second threshold; and in response to determining that the fifth data represents no events exceeding the second threshold, outputting a second indication of vacancy of the second area.

8. The computer-implemented method of claim 5, further comprising:

determining that at least a portion of the third data represents a plurality of events exceeding the first threshold without any events exceeding a second threshold for detection of major motion; and determining that a number of the plurality of events exceeds the first parameter, wherein:

the first parameter indicates a maximum number of events exceeding the second threshold between events exceeding the first threshold, and determining that the third data indicates an absence of motion in the second area during the second interval of time is based on determining that the number exceeds the first parameter.

9. The computer-implemented method of claim 5, further comprising:

identifying, in the second data, a first plurality of events exceeding the first threshold;

determining a mean and a variance corresponding to intervals between consecutive events in the first plurality of events;

identifying, in the third data, a second plurality of events exceeding the first threshold; and determining, using the mean and the variance, that the second plurality of events indicates an absence of motion in the second area during the second interval of time.

10. The computer-implemented method of claim 5, further comprising:

determining a first candidate threshold for identifying potential motion events;

processing the second data using the first candidate threshold to determine a first number of false positive detections of motion;

determining that the first number fails to satisfy a condition;

in response to determining that the first number fails to satisfy a condition, processing the second data using a second candidate threshold, lower than the first candidate threshold, to determine a second number of false positive detections of motion;

determining that the second number satisfies the condition; and in response to determining that the second number satisfies the condition, determining the first threshold using the second candidate threshold.

11. The computer-implemented method of claim 5, further comprising:

processing the first data using a first machine learning model to determine first embedding data;

processing the second data using a second machine learning model to determine second embedding data;

determining the at least first parameter using the first embedding data and the second embedding data; and updating the second machine learning model using the at least first parameter.

12. The computer-implemented method of claim 11, wherein:

the first machine learning model is a neural network model having at least an input layer, and intermediate layer, and an output layer, and the first embedding data represents an output of the intermediate layer.

13. An electronic device comprising:

an audible-frequency speaker;

one or more audible-frequency microphones;

an ultrasonic sensor system comprising:

one or more ultrasonic transmitters, and one or more ultrasonic receivers;

a wireless communication component;

one or more processors; and one or more computer readable media storing processor executable instructions which, when executed using the one or more processors, cause the electronic device to perform operations comprising:

determining, based on the wireless communication component, channel state information data, determining that the channel state information data indicates vacancy of a first area, determining, using the ultrasonic sensor system, ultrasonic sensor data, determining, based on the channel state information data and the ultrasonic sensor data, ultrasonic sensing configuration data for the ultrasonic sensor system, and determining, using the ultrasonic sensor system and based on the ultrasonic sensing configuration data, event data indicating an absence of motion in a second area.

14. The electronic device of claim 13, wherein the channel state information data is based on a wireless signal received using the wireless communication component.

15. The electronic device of claim 13, wherein the channel state information data is received from a second electronic device, and wherein the channel state information data is based on a wireless signal transmitted to the second electronic device using the wireless communication component.

16. The electronic device of claim 13, wherein the one or more computer readable media store processor executable instructions which, when executed using the one or more processors, cause the electronic device to perform operations comprising:

generating output data based on the channel state information data and the ultrasonic sensor data and using a machine learning model, wherein the ultrasonic sensing configuration data is based on the output data.

17. The electronic device of claim 13, wherein the ultrasonic sensing configuration data is determined using a machine learning model.

18. The electronic device of claim 13, wherein the one or more computer readable media store processor executable instructions which, when executed using the one or more processors, cause the electronic device to perform operations comprising:

determining, using the ultrasonic sensor system and based on the ultrasonic sensing configuration data, second event data indicating motion in the second area; and sending, using the wireless communication component, the second event data to a second electronic device.

19. The electronic device of claim 13, wherein the one or more computer readable media store processor executable instructions which, when executed using the one or more processors, cause the electronic device to perform operations comprising:

determining, based on second channel state information data, second event data indicating motion.

20. The electronic device of claim 13, wherein the one or more computer readable media store processor executable instructions which, when executed using the one or more processors, cause the electronic device to perform operations comprising:

determining, based on ultrasonic sensor data generated using the ultrasonic sensor system and second channel state information data, second event data indicating motion.

* * * * *